US009106704B2

(12) United States Patent
Altberg et al.

(10) Patent No.: US 9,106,704 B2
(45) Date of Patent: Aug. 11, 2015

(54) SYSTEMS AND METHODS TO PROVIDE CONNECTIONS VIA CALLBACK ACCEPTANCE

(75) Inventors: Ebbe Altberg, Mill Valley, CA (US); Scott Faber, San Francisco, CA (US); Ron Hirson, San Francisco, CA (US); Paul G. Manca, Oakland, CA (US); Sean Van Der Linden, Berkeley, CA (US); Virginia Hong-Jia Yang, Foster City, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 2102 days.

(21) Appl. No.: 11/697,932

(22) Filed: Apr. 9, 2007

(65) Prior Publication Data

US 2008/0175174 A1 Jul. 24, 2008

(51) Int. Cl.
*H04L 12/16* (2006.01)
*H04L 29/08* (2006.01)
*H04M 3/42* (2006.01)
*H04M 3/436* (2006.01)
*H04M 7/00* (2006.01)
G06Q 30/02 (2012.01)
*H04M 3/487* (2006.01)

(52) U.S. Cl.
CPC .............. *H04L 67/20* (2013.01); *G06Q 30/02* (2013.01); *H04L 67/22* (2013.01); *H04M 3/42195* (2013.01); *H04M 3/436* (2013.01); *H04M 3/4878* (2013.01); *H04M 7/003* (2013.01); *G06Q 30/0241* (2013.01); *G06Q 30/0277* (2013.01); *H04M 3/487* (2013.01)

(58) Field of Classification Search
CPC .......... G06Q 30/0273; G06Q 30/0251; G06Q 30/0277; G06Q 30/0241; G06Q 30/0276; G06Q 30/0242; G06Q 30/0271; G06Q 30/0269; G06Q 30/0272; G06Q 30/00; H04M 3/487; H04M 2203/2016; H04L 65/4069; H04L 67/02
USPC .......................................... 370/352–356, 259
See application file for complete search history.

(56) References Cited

U.S. PATENT DOCUMENTS

| 6,965,870 B1 | 11/2005 | Petras et al. |
| 7,142,840 B1 | 11/2006 | Geddes et al. |
| 7,319,976 B1 * | 1/2008 | Peckover .................... 705/14.36 |
| 8,041,604 B1 * | 10/2011 | Glaser ........................... 705/14.4 |
| 8,077,849 B2 | 12/2011 | Altberg et al. |

(Continued)

*Primary Examiner* — Melanie Jagannathan
*Assistant Examiner* — Najeebuddin Ansari
(74) *Attorney, Agent, or Firm* — Kilpatrick Townsend & Stockton LLP

(57) ABSTRACT

Systems and methods to selectively block calls from reaching destinations based on an input received from a callback connection. One embodiment includes a web server to receive a selection of an advertisement from an customer and to obtain a communication reference from the customer in response to the selection; a session border controller to interface with a packet switched network; and one or more telecommunication servers coupled to the session border controller and the web server, the one or more telecommunication servers to establish a connection for real time communications using the communication reference, to initiate a connection for real time communications with an advertiser of the advertisement after receiving an indication of acceptance of the connection established using the communication reference; where the advertiser is charged an advertisement fee in response to establishing a connection for real time communications between the advertiser and the customer.

20 Claims, 33 Drawing Sheets

(56) References Cited

U.S. PATENT DOCUMENTS

| | | |
|---|---|---|
| 2002/0035647 A1 | 3/2002 | Brown et al. |
| 2002/0198851 A1* | 12/2002 | Hashimoto et al. ........... 705/400 |
| 2005/0239447 A1 | 10/2005 | Holzman et al. |
| 2006/0034257 A1 | 2/2006 | Hollatz et al. |
| 2006/0106711 A1* | 5/2006 | Melideo .......................... 705/37 |
| 2006/0116924 A1* | 6/2006 | Angles et al. ................... 705/14 |
| 2007/0033102 A1* | 2/2007 | Frank et al. ..................... 705/14 |
| 2007/0061300 A1* | 3/2007 | Ramer et al. ...................... 707/3 |
| 2007/0112656 A1* | 5/2007 | Howe et al. ..................... 705/35 |
| 2007/0250562 A1* | 10/2007 | Kumar ........................... 709/203 |

* cited by examiner

Create you ad by entering a headline, two lines of description and a phone number Example:

Bert's Plumbing
Best Plumbers in San Francisco
800-555-5407
Interest ▭

To maximize your conversion rate and your ad's position, be as specific as possible in the description lines, and be sure you meet the requirements for ad format and content listed in the Editorial Guidelines Headline (maximum 26 characters)
[Bert's Plumbing]
Description line 1 (maximum 36 characters)
[Best Plumber in San Francisco!]
Description line 2 (maximum 36 characters)
[24/7/365. Guaranteed cheapest rates]
Phone number
[415-555-6823]

[Create Ad & Continue >>]

Google [Plumbing San Francisco]

Plumbing – San Francisco
Plumbing 1 – San Francisco
Plumbings – San Francisco
Plumber's of San Francisco
Scott's Plumbing Services
Better Homes - Plumbing Bert's Plumbing
San Luca Plumbing
San Fran Plumbing

- Create an account on ingenio
- Create ad (see left)
- Determine keywords and geography (city, state, zip, etc.)
- Determine bid amounts daily budget
- Launch campaign
- Unique 800# is automatically generated and rendered in advertisement. 800# redirects to LONON's actual phone number
- LONON pays for each phone call received

SCROLL DOWN to see more listings    Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS          scroll down for more listings

Dream Car Rentals                                         Cite Gold
3734 Las Vegas Blvd.
LAS VEGAS, NV
Phone: (702) 555-6661
Fax: (702) 555-6665
We Specialize in Excitement! Ferrari's. Viper's Porsche's & Hummers. Harley-Davidson's and SUV's "DRIVE THE DREAM"

Cite Gold
RENT-A-VETTE
5021 SWENSON STREET
LAS VEGAS, NV 89119
Phone: (702) 555-2692
Fax: (702) 555-2044

ONLINE LISTINGS                      scroll down for more listings

Expedia: For All Your Car Rental Needs  http://www.expedia.com
Save with Expedia.com, your one-stop source for flights, hotels, vacation packages, cruises, and rental

┌─────────────────────────────────────────────────────────────────────────┐
| ✉ You just received a call through yellowpages.com – Message (HTML)  _ □ ⊠ |
| File  Edit  View  Insert  Format  Tools  Actions  Help |
| ⤺Reply   ⤺Reply to All  ⤻Forward   \| 🔒 \| ! ↓ \| ✗ \| 🔁 ▾ |
| |
| From: Yellow Pages.com [customerservices@yellowpages.com]   Sent Mon 9/8/2003 3:16PM |
| To: Darik Wong |
| CC: |
| Subject: You just received a call through yellowpages.com |
|─────────────────────────────────────────────────────────────────────────|
| Dear Davis Law Offices, |
| |
| We are pleased to inform you that the customer call you just received from 770-894-1231 was generated |
| from your Yellowpages.com listing. We are pleased to play a part in growing your business and are |
| standing by to offer you a wide range of valuable services to help you achieve your goals. Please contact |
| us at 999-999-9999 if we can be of any further assistance. |
| |
| Best regards, |
| |
| The Team at Yellowpages.com |
└─────────────────────────────────────────────────────────────────────────┘

FIG. 10

| Callee's User ID 3101 | Callee's Phone Number 3102 | Caller's User ID 3103 | Caller's Phone Number 3104 | Caller's IP Address 3105 | Block Expiration 3106 |
|---|---|---|---|---|---|
| A123 3111 | * 3112 | * 3113 | 456-789-1234 3114 | 178-25-3 3115 | 2006-11-31 3116 |
| * 3121 | * 3122 | * 3123 | 456-789-1234 3124 | * 3125 | 2006-12-31 3126 |
| B213 3131 | * 3132 | C821 3133 | 456-789-1234 3134 | * 3135 | 2006-12-31 3136 |
| D533 3141 | 800-789-1234 3142 | C821 3143 | 456-789-1234 3144 | * 3145 | 2006-12-31 3146 |

SYSTEMS AND METHODS TO PROVIDE CONNECTIONS VIA CALLBACK ACCEPTANCE

CROSS-REFERENCE TO RELATED APPLICATIONS

This application is related to: U.S. application Ser. No. 11/678,012, entitled "Systems and Methods to Confirm Initiation of a Callback" and filed on Feb. 22, 2007, and U.S. application Ser. No. 11/624,641, entitled "Systems and Methods to Block Communication Calls" and filed on Jan. 18, 2007. The disclosures of the above referenced applications are hereby incorporated herein by reference.

TECHNOLOGY FIELD

At least some embodiments of the disclosure relate to user interface techniques to assist people to connect for real-time communication, such as connecting people for telephonic conversation, chat, document sharing, screen-sharing, etc.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

BRIEF DESCRIPTION OF THE DRAWINGS

The disclosure is illustrated by way of example and not limitation in the figures of the accompanying drawings in which like references indicate similar elements.

FIG. 8A shows an example of a user interface that may be presented to a user during advertisement creation, in accordance with one embodiment.

FIG. 9 shows an example of a search engine result page, which includes an advertisement generated, in accordance with one embodiment.

FIG. 10 shows an example of an email alert that is sent to an advertiser, when a call is generated, in accordance with one embodiment.

FIG. 31 illustrates rules to block calls according to one embodiment.

SUMMARY

Figure 1:
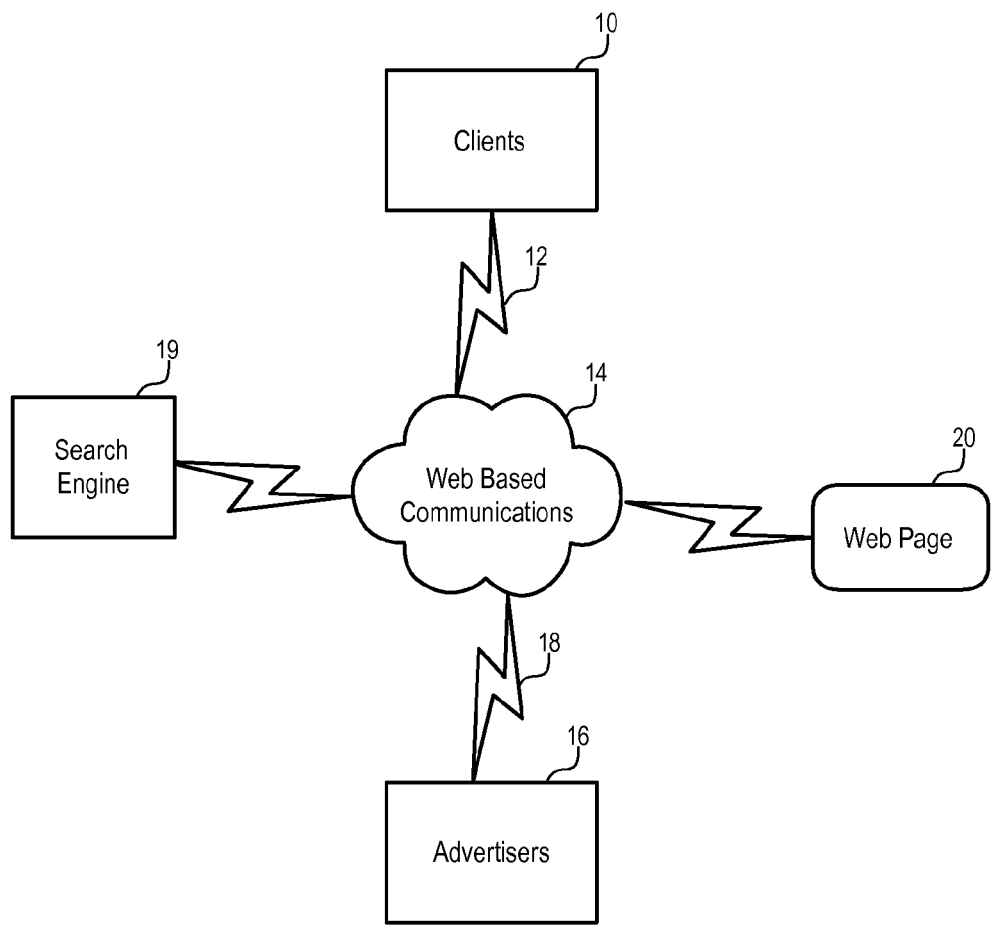
FIG. 1 shows how clients and advertisers interact with each other using a paid placement, or a paid inclusion advertising model, in accordance with the prior art.

Systems and methods to selectively block calls from reaching destinations based on an input received from a callback connection are described herein. Some embodiments are summarized in this section.

One embodiment includes a web server to receive a selection of an advertisement from an customer and to obtain a communication reference from the customer in response to the selection; a session border controller to interface with a packet switched network; and one or more telecommunication servers coupled to the session border controller and the web server, the one or more telecommunication servers to establish a connection for real time communications using the communication reference, to initiate a connection for real time communications with an advertiser of the advertisement after receiving an indication of acceptance of the connection established using the communication reference; where the advertiser is charged an advertisement fee in response to establishing a connection for real time communications between the advertiser and the customer.

In one embodiment, a method includes: presenting an advertisement to a customer; responsive to receiving a selection of the advertisement from the customer, obtaining a communication reference from the customer; establishing a connection for real time communications using the communication reference; initiating a connection for real time communications with an advertiser of the advertisement after receiving an indication of acceptance of the connection established using the communication reference; and charging the advertiser an advertisement fee in response to establishing a connection for real time communications between the advertiser and the customer.

The present disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description.

References to one or an embodiment in the disclosure can be, but not necessarily are, references to the same embodiment; and, such references mean at least one. Reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a system is to provide services to people who wish to make connections for real time communication, such as live telephone conversation, chat, video conferencing, instant messaging, and other forms of real time communications.

For example, benefits of the services may include anonymity for one or more of the parties of the real time communication. For example, the service can connect the caller and callee without revealing the contact information of one party to another, such as the actual telephone number. The services may include filtering callers/participants so that only those who are willing to pay can get connected. The services may include collecting payments for the callee so that the callee can earn money from talking to the callers over the phone without the burden of managing payment collection, etc. The services may include scheduling so that the real time communication are initiated at a convenient time (e.g., no night calls). The services may include queue managing to serve both the callees and the callers. The services may include providing the cool, convenient click-to-call functionality to attract callers for the callees. The service may provide any combination of the benefits discussed above and other benefits disclosed herein.

In one embodiment, the services may include providing a persistent and consistent way to reach people. For example, a web link, or a toll-free number, or a local phone number can be provided by the system so that the callers can reach the callee using the web link, or the toll-free number, or the local phone number even after the telephone of the callee has been changed. The callee can publish the web link and/or the phone number, knowing that the calls will follow if the callee updates the telephone number in the system. The callees do not need to reveal their actual telephone numbers to the potential callers. If desired, the callee can keep the caller from knowing the actual telephone number of the callee for anonymity.

In one embodiment, a system can connect communicators to communicatees for real time communication via communication references assigned to the communicatees. The communicators can request the system to establish communication links to the communicatees through contacting the system via the communication references. The system identifies the communicatees based on the communication references the communicatees used to make the requests. The system can provide various communication links, such as telephone, video, text, web, WAP, Short Message Service (SMS) message, Multimedia Message Service (MMS) message, web television, instant message, document sharing, screen sharing, and common whiteboarding.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
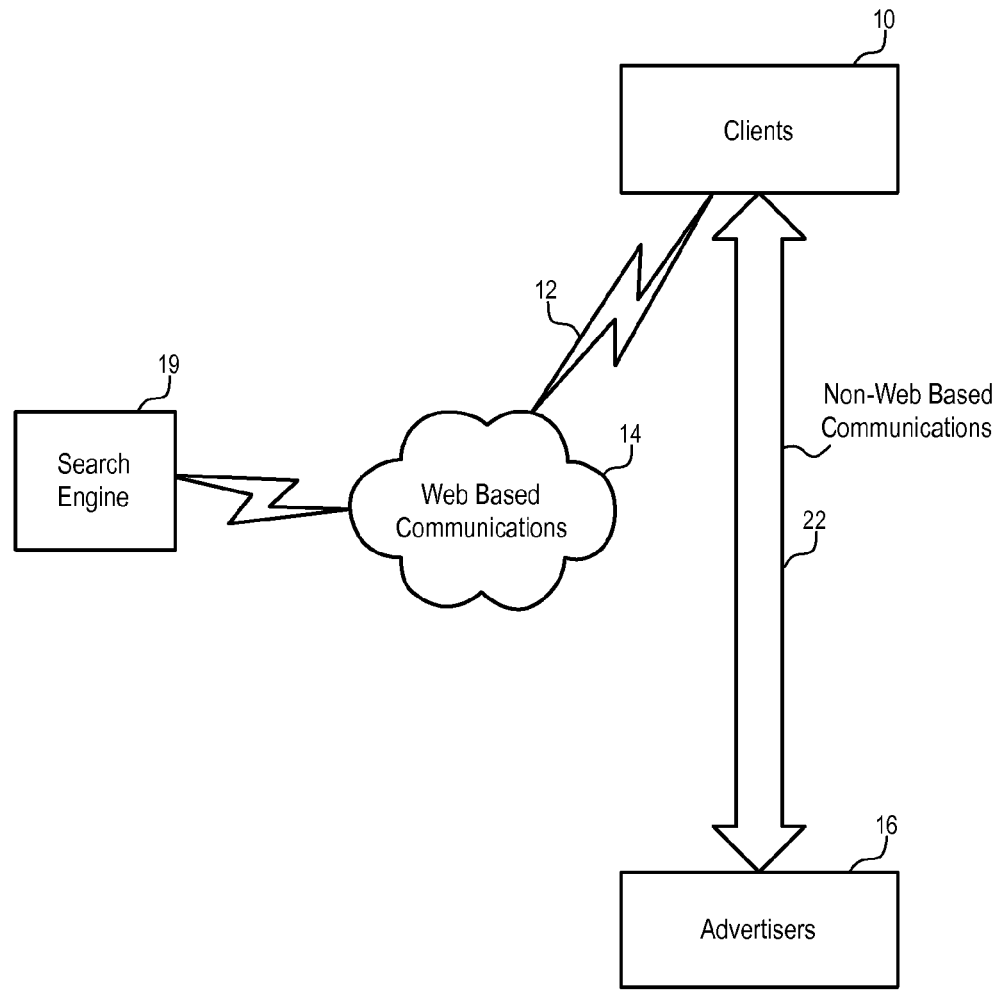
FIG. 2 shows an interaction between clients and advertisers, in accordance with one embodiment.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques disclosed allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to some embodiments, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
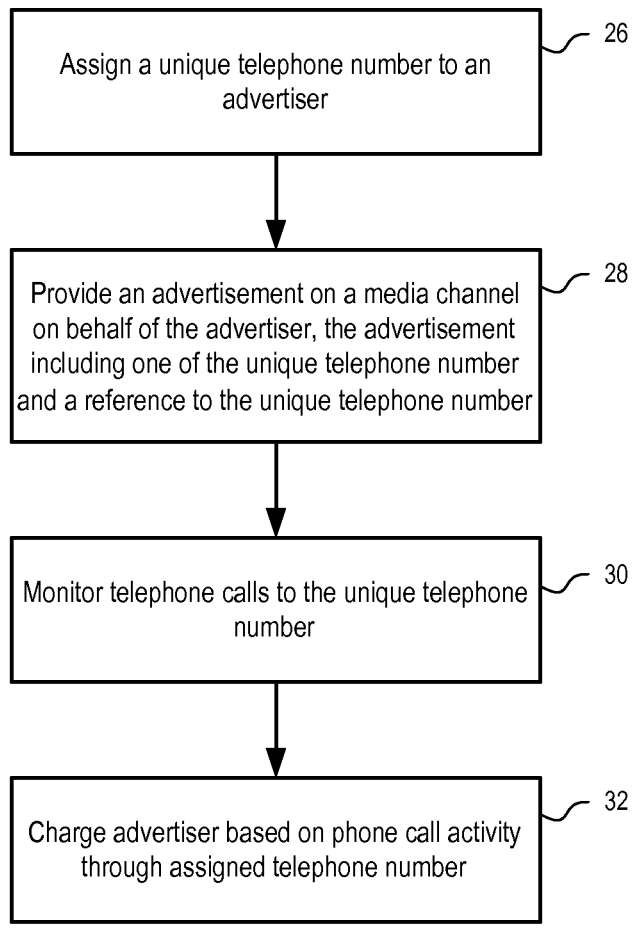
FIG. 3 shows a flowchart of operations performed in accordance with one embodiment.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
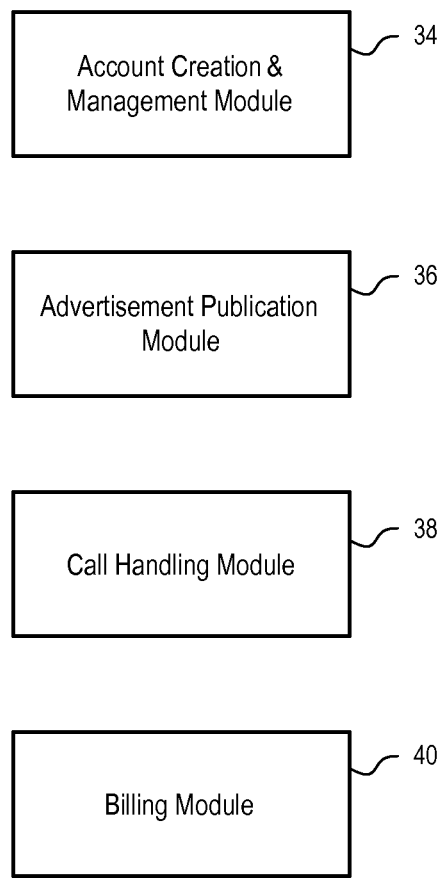
FIG. 4 shows a high level functional description of a system in accordance with one embodiment.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system.

Figure 5:
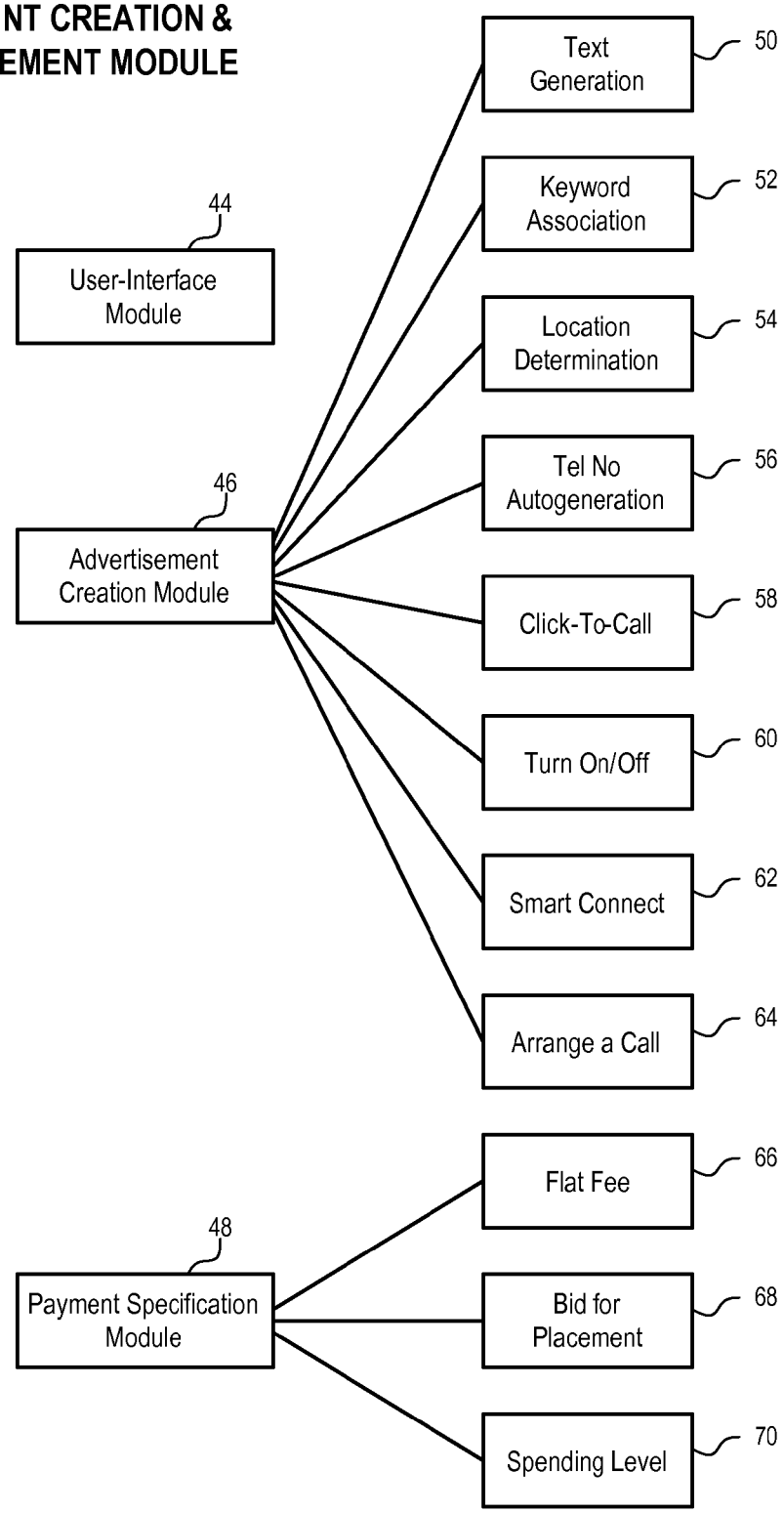
FIG. 5 illustrates the Account Creation and Management module of the system.
Figure 8B:
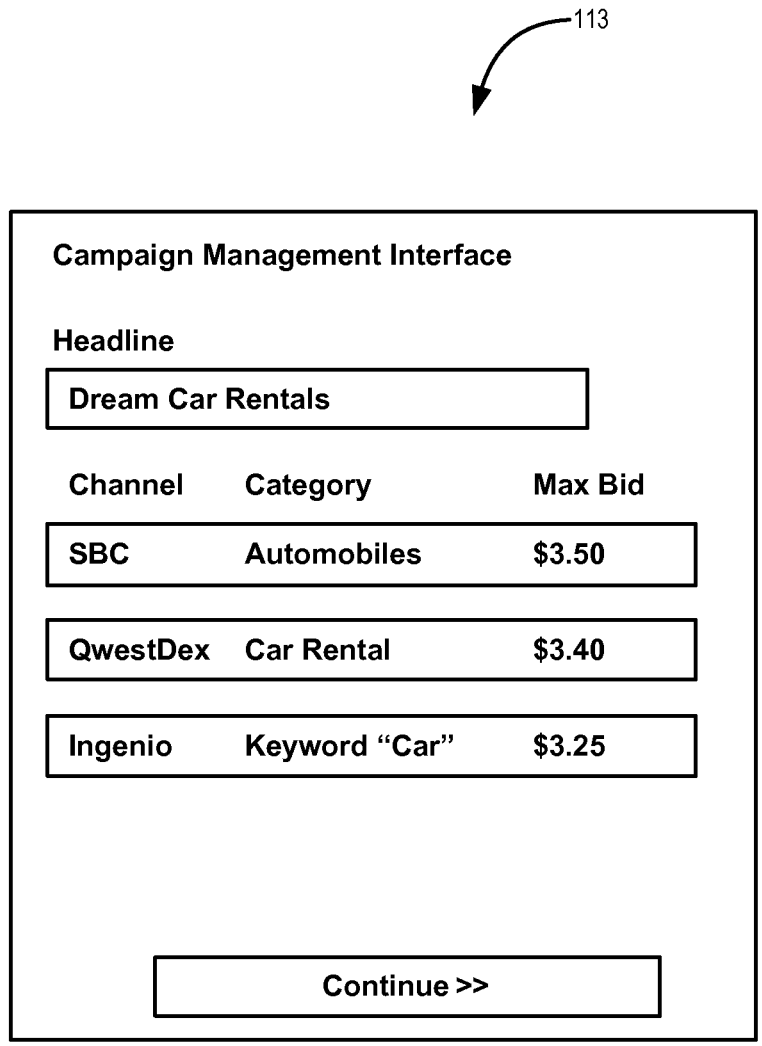
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8A to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. The system of one embodiment can be configured to waive the charges on leads from customers who have already called a particular advertiser within a specified number of days. In alternative embodiments, additional, less, or different logic may be included in the system.

Figure 6:
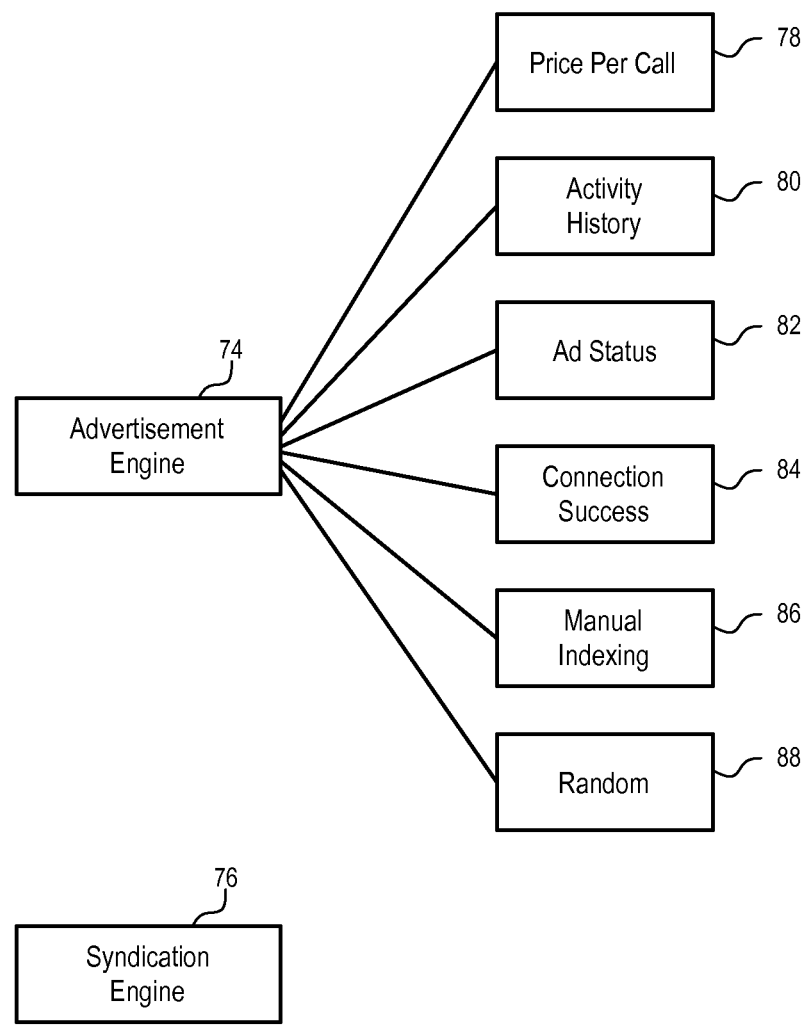
FIG. 6 illustrates the Advertisement Publication Module of the system.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the one embodiment.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser   | (Bid Amount per call) |
|-----------|--------------|----------------------|
| 1         | 800-349-2398 | ($3.88)              |
| 2         | 866-324-3242 | ($3.22)              |
| 3         | 800-323-5321 | ($2.01)              |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Figure 7:
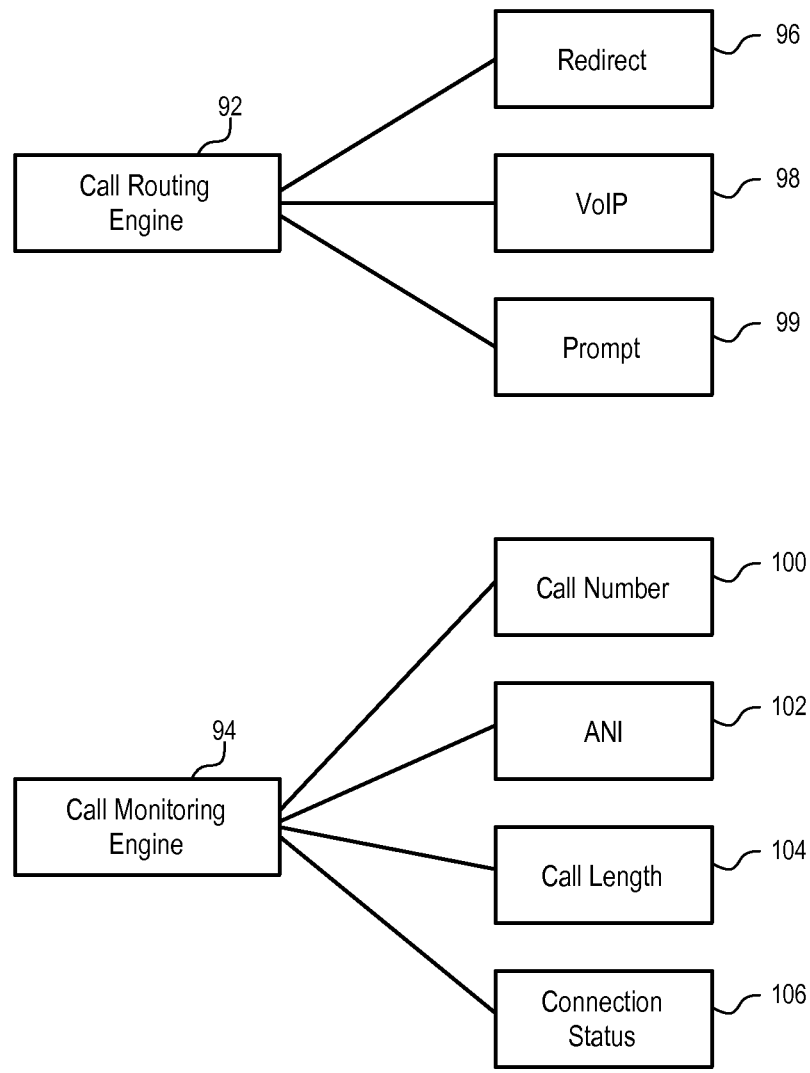
FIG. 7 illustrates the Call Handling Module of the system.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. In one embodiment, the report provides additional information based on an address lookup of the ANI, including but not limited to demographic, socioeconomic, and psychometric information. The report may be used by Burt in order to monitor the effectiveness of an advertisement campaign, and to optimize the campaign. In alternative embodiments, additional, less, or different logic may be included in the call monitoring engine 94.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
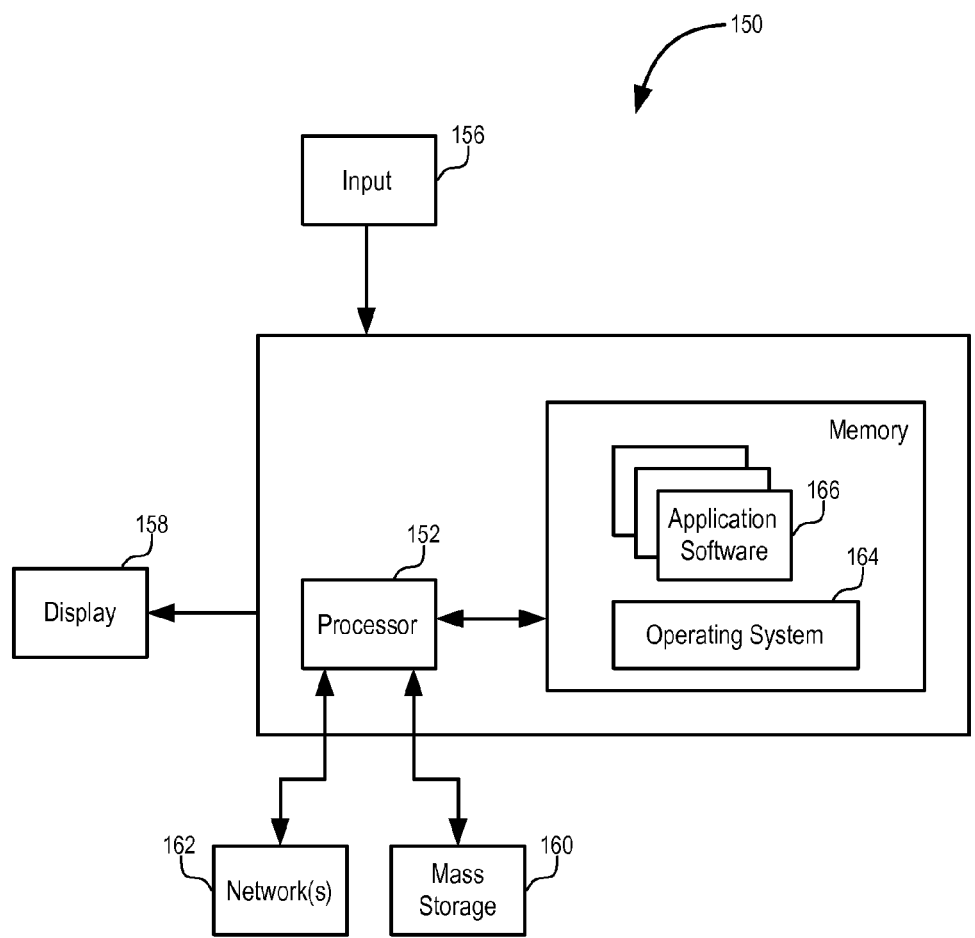
FIG. 11 shows a high level hardware block diagram of a system that may be used to implement the system, in accordance with one embodiment.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
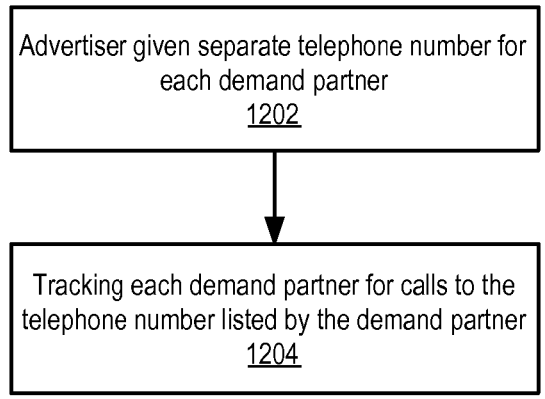
FIGS. 12-18 describe processes to track/credit demand partners in accordance with some embodiments.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
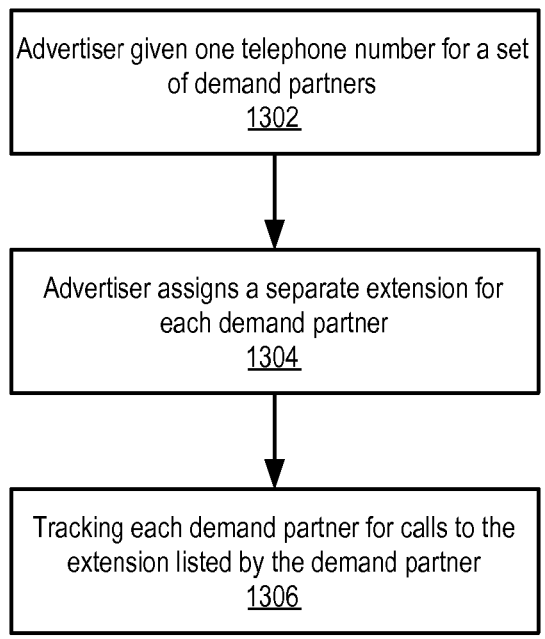

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
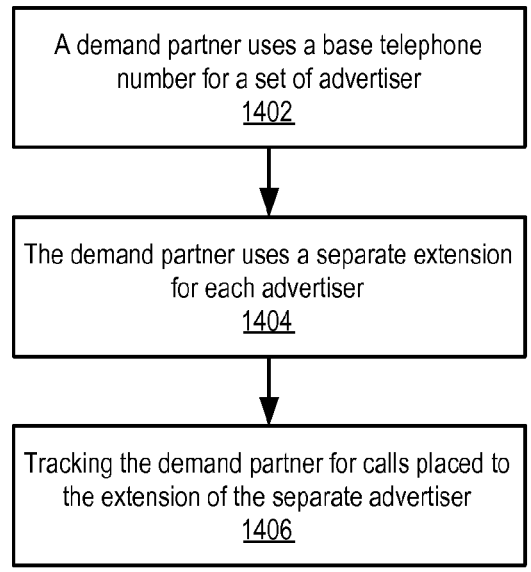

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
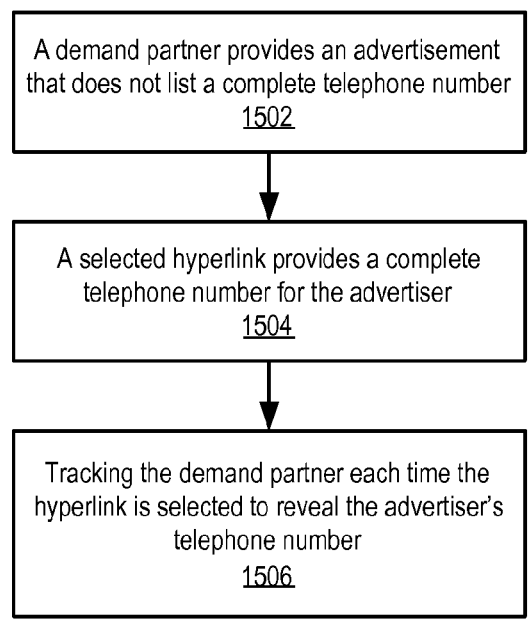

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
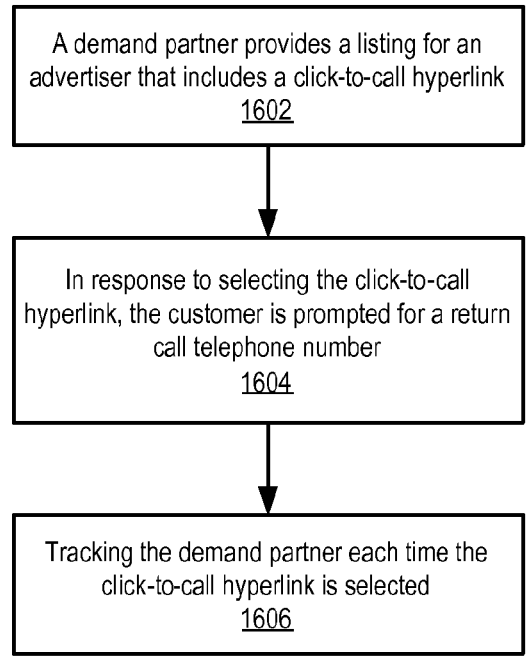

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
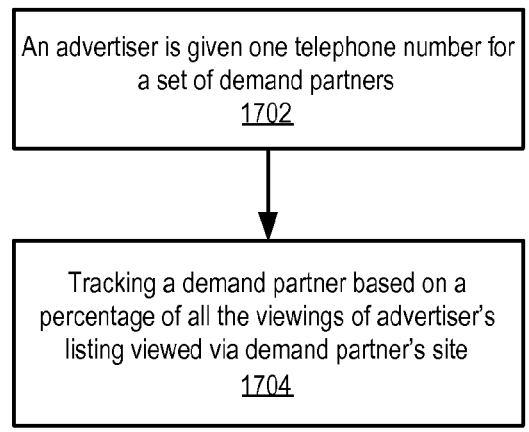

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
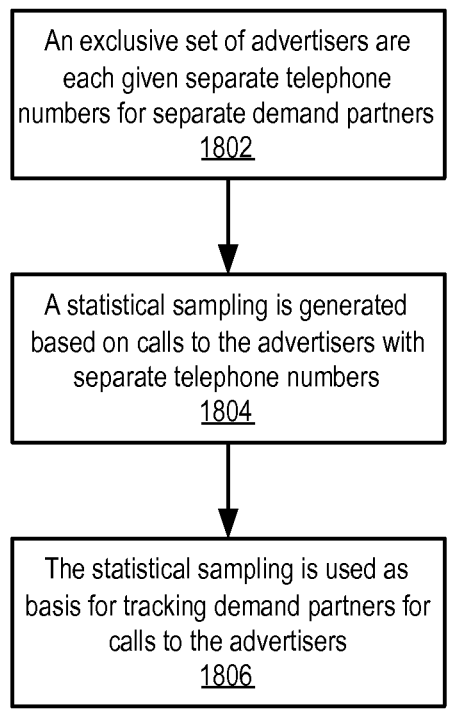

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

In one embodiment, the unique telephone numbers assigned to an advertiser and/or a demand partner is for a short period of time after the listing of the advertiser containing the unique telephone numbers is presented. After the time period, the telephone numbers can be re-assigned to other advertisers.

Figure 19:
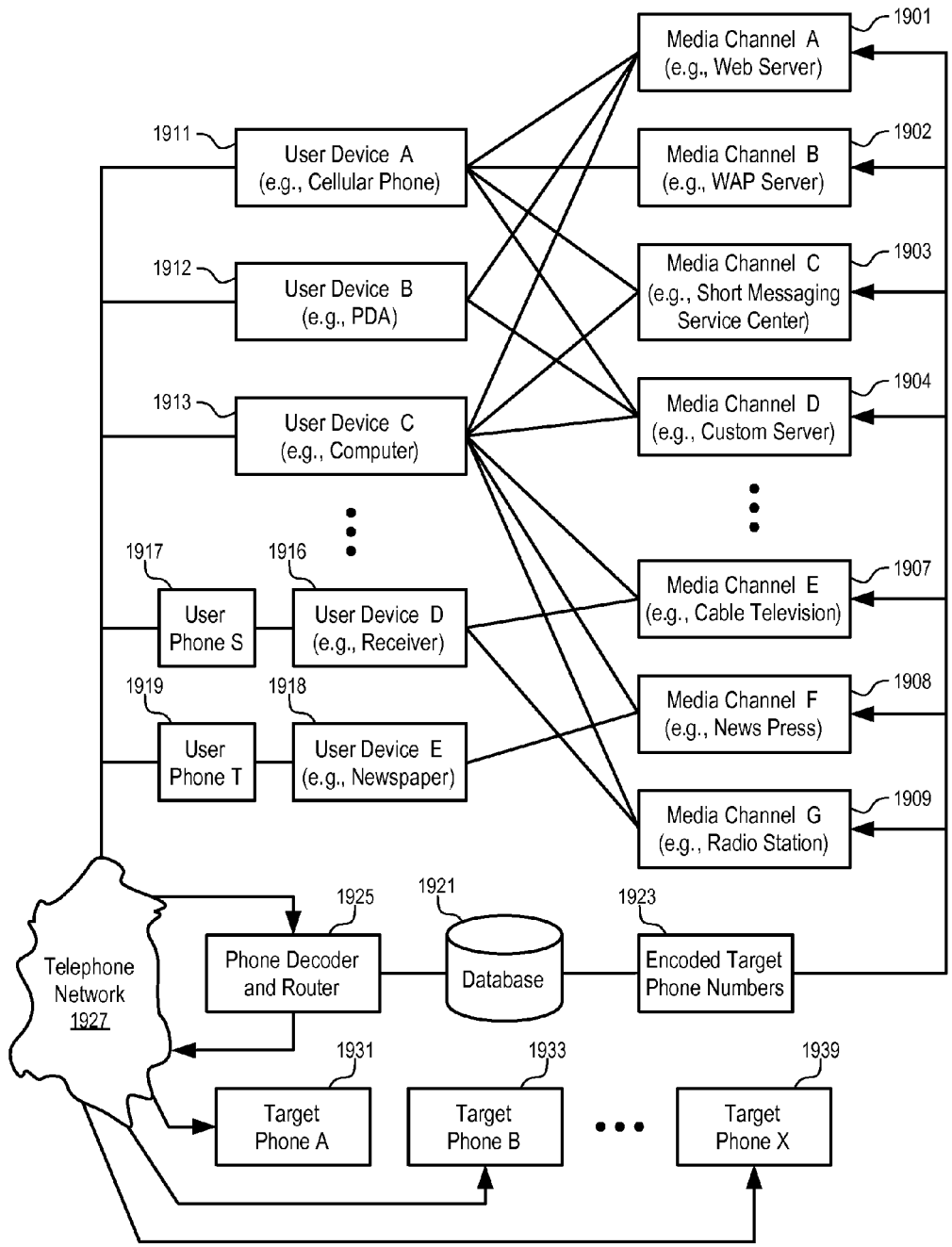
FIG. 19 shows a diagram of a system to make and track phone connections according to one embodiment.

FIG. 19 shows a diagram of a system to make and track phone connections according to one embodiment. In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, packet switched, or partially circuit switched and partially packet switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment, the phone decoder and router (1925) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join/bridge the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

In one embodiment, a system is provided to allow the confirmation of a callback request before a callback is performed to establish a communication connection.

Figure 21:
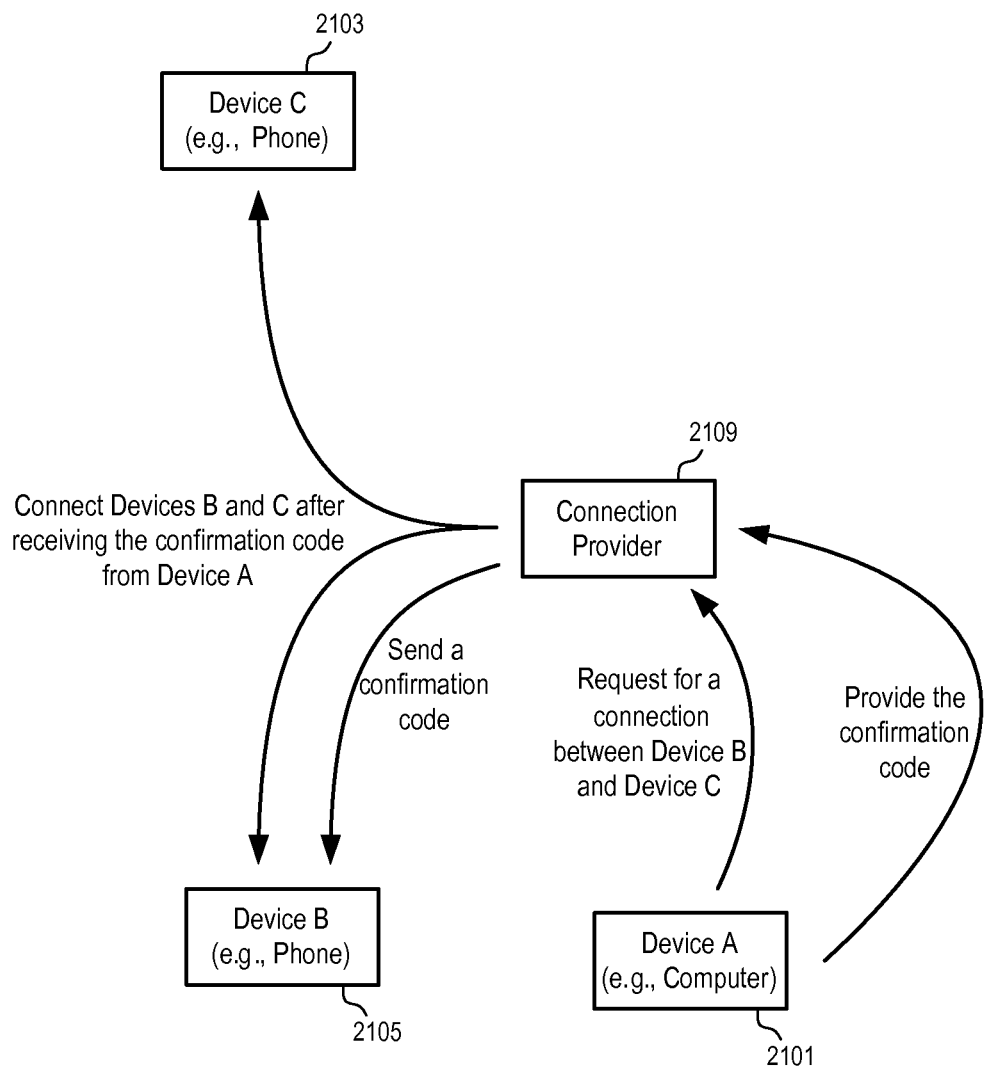
FIGS. 21-24 illustrate methods to confirm callback request according to some embodiments.

FIGS. 21-24 illustrate methods to confirm callback request according to some embodiments. In FIG. 21, a connection provider (2109) is capable of providing a communication connection via making separate connections to the device C (2103) (e.g., a phone) and device B (2105) (e.g., a phone).

For example, when the connection provider (2109) receives a request for a connection between device B (2105) and device C (2103) from device A (2101) (e.g., a computer), the connection provider (2109) receives a communication reference (e.g., a phone number) of the device B (2105). Using the communication reference of the device B (2105), the connection provider (2109) is capable of making a connection between the device B (2105) and the connection provider (2109).

In one embodiment, before the initiation of the connection to the device B (2105), a confirmation code is sent to the device B (2105) using the communication reference of the device B (2105) that is received in the request from the device A (2101). A user in control of the device B (2105) can obtain the confirmation code and provide the confirmation code back to the connection provider (2109) via the device A (2101) to confirm the request.

After the connection provider (2109) receives the correct confirmation code from the device A (2101), the connection provider (2109) then starts to connect devices B and C (2105 and 2103).

Thus, if the user of device A (2101) is not in control of the device B (2105), the user would not be able to provide the correct confirmation code to confirm the request. Such an arrangement can be used to prevent false requests from being used to harass the owner of the device B (2105).

In one embodiment, the confirmation code is sent to the device B (2105) without making a connection to the device B (2105) for real time communication.

For example, instead of calling the device B (2105), the confirmation code can be sent to the device B (2105) via a data channel, such as SMS, email, presence status, etc. The delivery of the confirmation code is less intrusive for the user of the device B than a call for a connection for real time communication. For example, receiving a confirmation code to a mobile phone (e.g., cellular phone) via a text message is less annoying than an unsolicited call.

In one embodiment, the use of the confirmation code is required for the initiation of the requested connection in response to indications of abuse, error, or abnormality. For example, a confirmation code may be used after the device A (2101) is used to request callbacks to a number of different devices in a short period of time, or a callback to the device B (2105) in response to a previous request was not answered or disconnected shortly after being answered.

In one embodiment, the device B (2105) is capable of supporting real time communication in voice, as well as data reception without a call. In one embodiment, the received data are designed to be viewed in response to a request from the user. Preferably, the reception of the data does not require the user to answer a call for a connection. Thus, the use of the data reception capability of the device B (2105) to deliver the confirmation code can reduce the degree of intrusiveness, if the request is submitted from device A (2101) without the authorization of the user of device B (2105).

In one embodiment, the device used to submit the request for a callback is the same as the device that is to be called back. When the connection provider (2109) determines that the user is in possession of the device that is to be called back, the connection provider (2109) can make the requested connection without sending a confirmation code.

In one embodiment, when the connection provider (2109) cannot determine whether the received request is from the user of the device that is to be called back, the connection provider (2109) may send the confirmation code to the device B (2105) and require the confirmation code from the requester to confirm the request.

Figure 22:
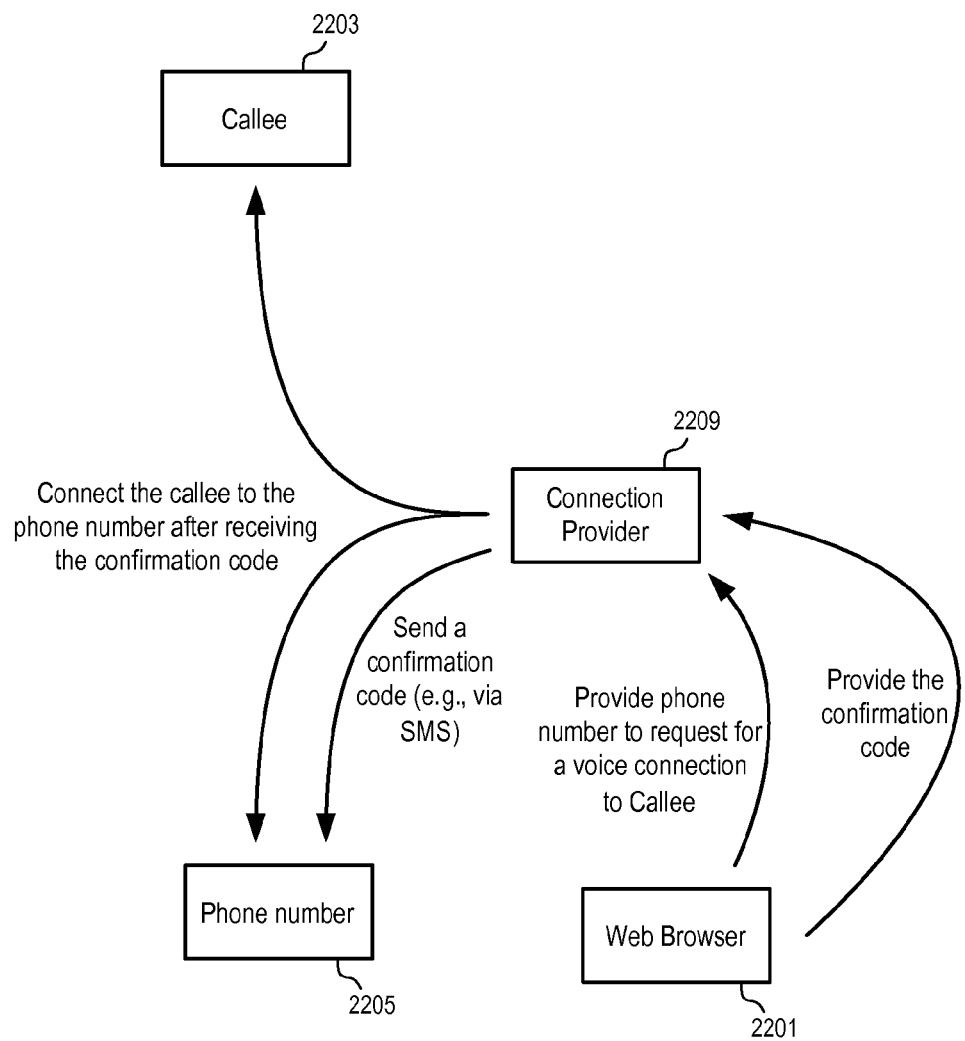

FIG. 22 illustrate an example of requesting a callback to a phone number (2205) for a voice connection to the callee (2203).

For example, a click-to-call icon may be presented in the web browser (2201). When the click-to-call icon is selected in the web browser (2201), a request for a callback to the phone number (2205) is sent to the connection provider (2209).

The phone number (2205) may be provided to the connection provider via a subsequent page that allows the user of the web browser to enter the phone number. Alternatively, the phone number (2205) can be configured to be stored in the computer that runs the web browser (2201) and provided to the connection provider (2209) when the click-to-call icon is selected. Alternative, the click-to-call icon may include a reference which can be used by the connection provider (2209) to determine the phone number (2205) (e.g., through decoding/decrypting the reference or through looking up the phone number from a database using the reference).

In one embodiment, the phone number (2205) is for a phone that is connected to a landline from a circuit switched telephone network, or a mobile phone, such as a cellular phone, or a satellite phone.

In one embodiment, the phone number (2205) is assigned by a telephone carrier to a VoIP-based telephone, such as a software-based phone, a Universal Serial Bus (USB) phone, a Bluetooth phone, etc. The phone number (2205) can be dialed using a plain old telephone system over a circuit switched telephone network. When the phone number is being called from a circuit switched telephone network, the telephone carrier bridges the circuit switched telephone network and the packet switched network at the telephone number.

Alternatively, the phone number (2205) is a VoIP-based phone reference, such as a user identifier of an instant messaging network, a uniform resource identifier, a session initiation protocol (SIP) address, etc.

In response to the web browser (2201) providing the phone number (2205) to the connection provider (2209) for a callback, the connection provider (2209) sends a confirmation code to the phone number via a data communication channel (e.g., via SMS).

In one embodiment, the connection provider (2209) determines the capability of the device at the phone number (2205) through looking up from a telephone directory. For example, when the telephone number is assigned to a cellular phone (e.g., serviced by a specific telephone carrier), the connection provider may determine that the device at the telephone number has the capability to receive SMS messages. In one embodiment, the connection provider (2209) determines the capability of the device at the phone number (2205) through receiving input from the web browser (2201). In one embodiment, the connection provider determines the capability of the device at the phone number (2205) from a database.

In one embodiment, the request for a callback is sent from the web browser (2201), when the user selects a click-to-call icon displayed in the web browser (2201). Alternatively, the request for a callback can also be sent via other communication methods. For example, a request can be sent via an email gateway, or SMS gateway, an instant messaging (IM) gateway, or a custom application using a custom designed communication protocol.

In one embodiment, when the connection provider (2209) fails to find a data communication channel to transmit a confirmation code to the phone number (2205), the user may be instructed to call the connection provider (2209) from the phone number (2205) to obtain a confirmation code. When the user calls from the phone number (2205) to obtain the confirmation code, the connection provider (2209) can use the Automatic Number Identification (ANI) service to verify that the confirmation code is provided to a caller from the phone number (2205).

Figure 23:
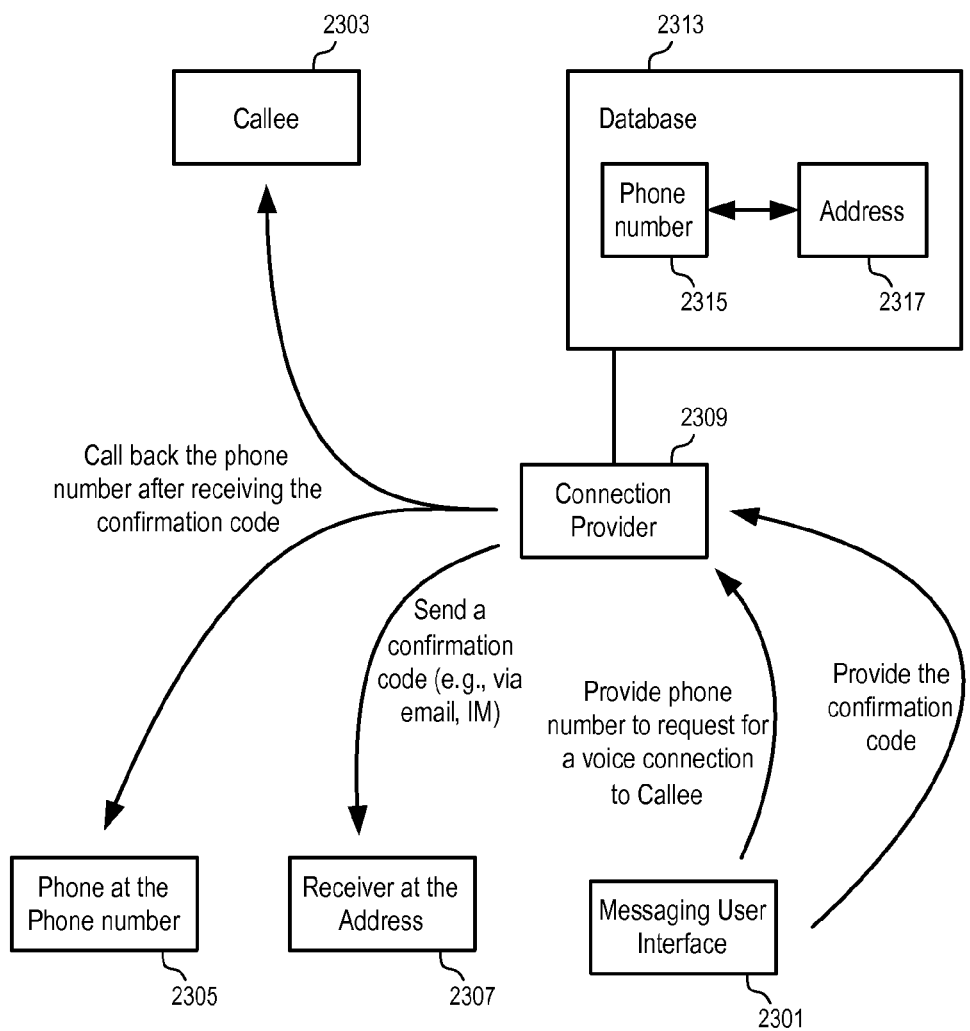

In one embodiment, instead of sending the confirmation code to the phone number (2205), the confirmation code is sent to an address that has a know relation with the phone number, as illustrated in FIG. 23.

In FIG. 23, a messaging user interface (2301) is used to provide the phone number (2315) to the connection provider (2309) to request for a voice connection to callee (2303) via calling back the phone (2305) at the phone number (2315). Since the phone (2305) may not support data reception, the connection provider (2309) can look up an address (2317) from the database (2313) using the phone number (2315) and send the confirmation code to the receiver (2307) at the address (2317). The receiver (2307) may be an email reader, an instant messaging application, etc.

Alternatively, a known relation between the address and the phone number can be used to compute the address from phone number. For example, an email address associated with the phone number can be a combination of the phone number and a domain identifier of the telephone carrier of the phone number. The telephone carrier may deliver the email via SMS, or forward the email to another email address of the user.

In one embodiment, the phone (2305) and the receiver (2307) are separate devices. For example, the receiver (2307) is running on a computer which may or may not run the messaging user interface (2301) (e.g., a web browser). Alternatively, the phone (2305) and the receiver (2307) can be on the same device. For example, the receiver (2307) may be an email client program running on the phone (2305).

In one embodiment, the confirmation code is transmitted to the receiver (2307) in a way which does not typically require the immediate attention of the user. For example, an email is typically queued in the inbox for viewing at a time convenient to the user.

In one embodiment, a presence status is used to transmit the confirmation code to the receiver (2307) via an instant messaging network. For example, the connection provider may appear as a buddy of the user in the receiver (2307); and the confirmation code is provided to the receiver (2307) as part of the presence status information of the connection provider. If the user of the receiver is not the requester, the user would not be bothered by the status information of the connection provider. If the user is expecting the confirmation code, which is required for the confirmation of the request for a connection to the callee (2303), the user can easily obtain the confirmation code and confirm the request for callback.

In FIG. 23, the connection to the callee (2303), established via a callback, supports voice communication (e.g., a phone connection).

Alternatively or in combination, the connection process according to embodiments of the disclosure can also be used to provide a connection for instant messaging, image, video, file sharing, application sharing (e.g., common whiteboarding), etc.

For example, a callback may be used to establish a text chat session between a customer and an adviser. For example, a callback may be used to establish an application sharing session between a customer and a specialist for training, trouble shooting, etc. For example, a callback may be used to establish a video conferencing session for meeting, presentation, entertainment, etc.

In one embodiment, the connection provider bridges two individual connections to the callee and to the caller to provide privacy for the callee and/or the caller. Thus, the addresses and/or the identities of the callee and/or the caller are not revealed to each other through the communication connection. The caller and the callee may choose to remain anonymous to each other even after the communication session.

In one embodiment, the connection provider tracks the calls made to the callee through providing the connection. For example, pay for performance advertisements can be charged based on the communication leads generated for the advertisers. Through tracking the calls generated via advertisements, the advertisements can be charged on a per call basis (e.g., based on a count of calls). The calls may be a telephone call, a call for an instant messaging session which may support text, voice, image and/or video, a call for an application sharing session, etc.

Figure 24:
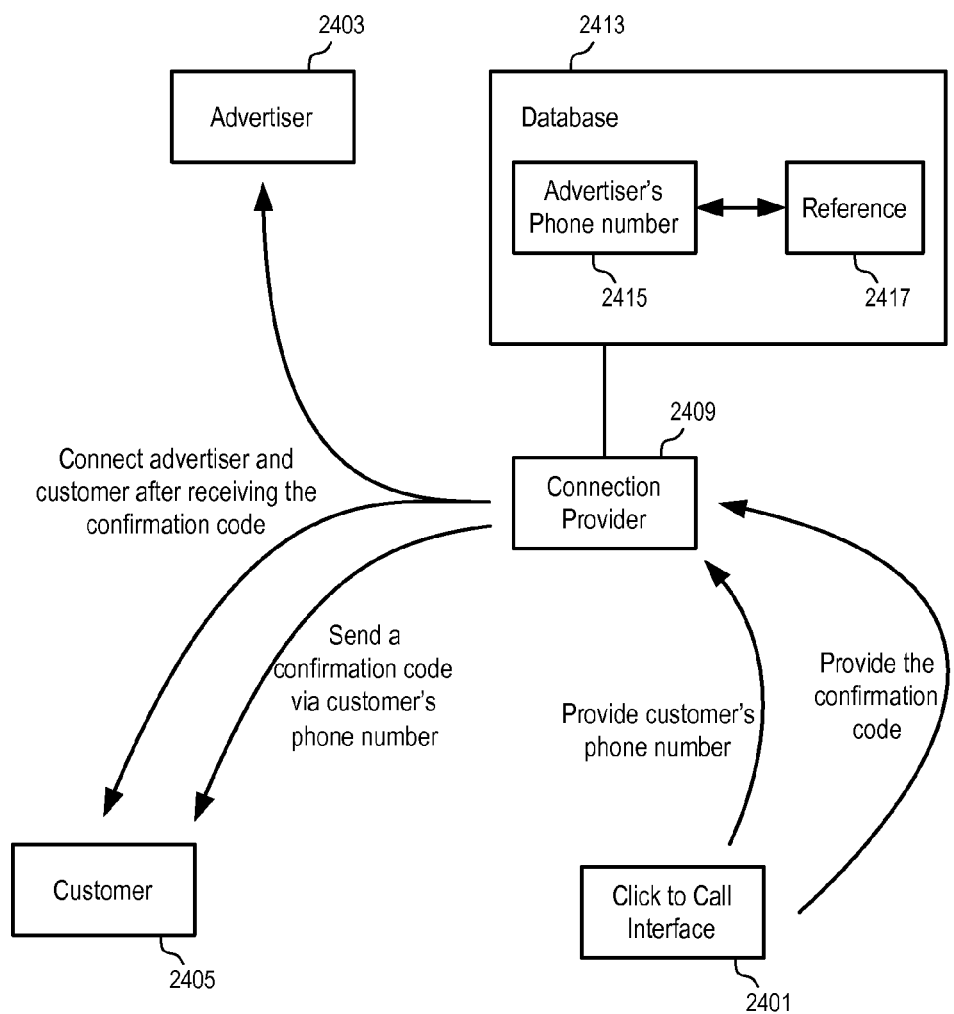

FIG. 24 illustrates an example in which an advertisement is provided with a click to call interface (2401), which includes a selectable link, icon or button embedded in the advertisement. When selected, the click to call interface sends a request to the connection provider (2409) for a callback.

In one embodiment, the click to call interface for the advertisement includes a reference (2417) which is associated with the advertiser's phone number (2415) in database (2413). The reference (2417) is sent to the connection provider (2409) with the callback request; and the connection provider (2409) looks up the advertiser's phone number (2415) using the received reference (2417).

In another embodiment, the click to call interface for the advertisement includes an encoded/encrypted version of the advertiser's phone number, which can be decoded/decrypted without relying upon a database (2413).

The click to call interface also provides the customer's phone number to the connection provider.

Since the phone number of the advertiser (2403) is not provided in the advertisement directly, a customer responding to the advertisement calls the advertiser (2403) via the connection provider (2409). Thus, the number of calls generated from the advertisement can be measured.

In one embodiment, to prevent the connection provider (2409) from calling a wrong customer (e.g., because of an unintentional or intentional error in the phone number provided by the requester), the connection provider (2409) may provide the confirmation code to the customer via the customer's phone number and require the correct conformation code from the click to call interface (2401) to connection the advertiser (2403) and the customer (2405).

In one embodiment, after the confirmation code is verified, the connection provider (2409) initiates calls to both the advertiser (2403) and the customer (2405) (e.g., via VoIP calls). Based on the phone numbers of the advertiser (2403) and the customer (2405), the calls initiated from the connection provider (2409) may be terminated by one or more telephone carriers at phones connected to a circuit switched network, or a package switched network.

In one embodiment, the advertiser (2403) specifies the price bid for each calls received from the advertisement; and the advertisements are presented based at least in part on the price bids. For example, when the advertisements are presented in response to a search, the order in which relevant advertisements are presented can be based on the price bids.

In one embodiment, the advertiser (2403) provides services (e.g., advice, entertainment, information, etc.) over the communication connection to the customer (2405). The customer (2405) is charged for the time of the advertiser (2403); and a portion of the fee charged by the advertiser (2403) is retained by the connection provider (2409) for the service rendered by the connection provider (2409).

In one embodiment, a seller who offers services over the communication connection provided by the connection provider (2409) may include the click to call interface in their own web site, blog, email, etc. The click to call interface includes the reference (2417) that is associated with the advertiser's phone number (2415). Thus, the connection provider (2409) provides the connection service but may or may not provide advertising service. In one embodiment, the connection provider (2409) also provide the services of collecting fees from the customer (2405) on behalf of the seller (e.g., advertiser 403), if the customer (2405) purchases communication time with the seller.

Figure 25:
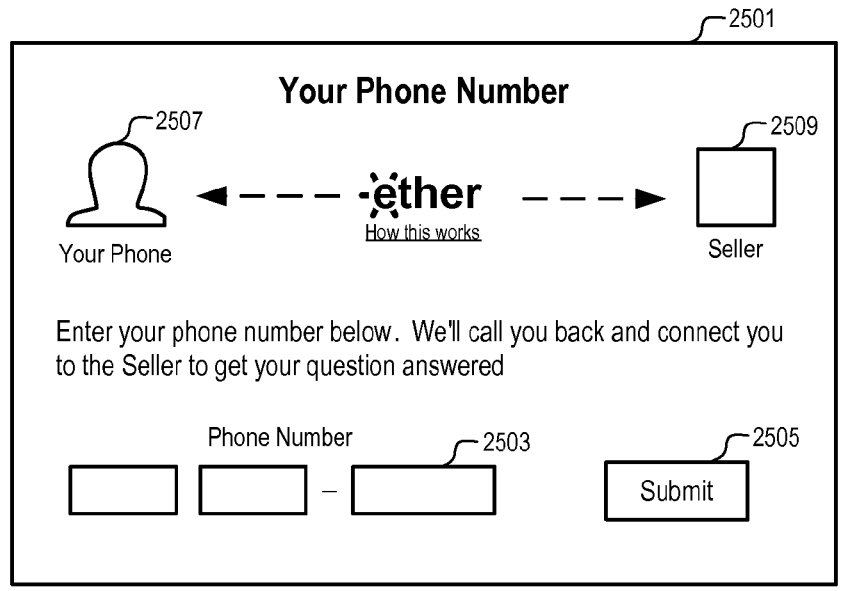
FIGS. 25-26 illustrate user interfaces which can be used to guide a user through a callback process according to some embodiments.
Figure 26:
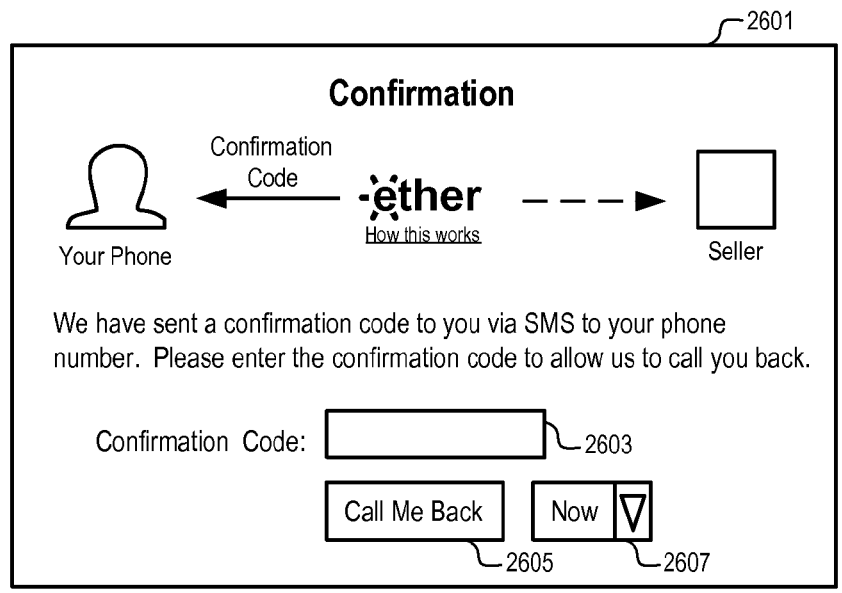

FIGS. 25-26 illustrate user interfaces which can be used to guide a user through a callback process according to some embodiments. In FIGS. 25-26, a graphical representation of the connection process is presented with status information illustrating the progress of the connection process and instructions for the user to step through the connection process.

For example, in FIG. 25, the interface (2501) shows that the connection to the phone of the user and the connections are to be established, as indicated by the dotted lines pointing to the icons (2507 and 2509) the represent the caller and the callee. The user is prompted to enter the phone number in entry boxes (2503) and use the "submit" button (2505) to provide the system with the callback phone number.

After the callback phone number is received, the interface (2601) in FIG. 26 is shown, which indicates that a confirmation code has been sent to the phone number of the user. The user is prompted to enter the confirmation code in entry box (2603) to confirm the request for call back using the "call me back" button (2605). The user may choose to called back immediately or after a period of time using the selection box (2607). In one embodiment, a user can select a time period from a set of predetermined time periods (e.g., 1 minute, 2 minutes, 5 minutes, 10 minutes, 15 minutes, etc.). In another embodiment, the user can enter the minutes that the system should wait before calling back the phone number.

Figure 27:
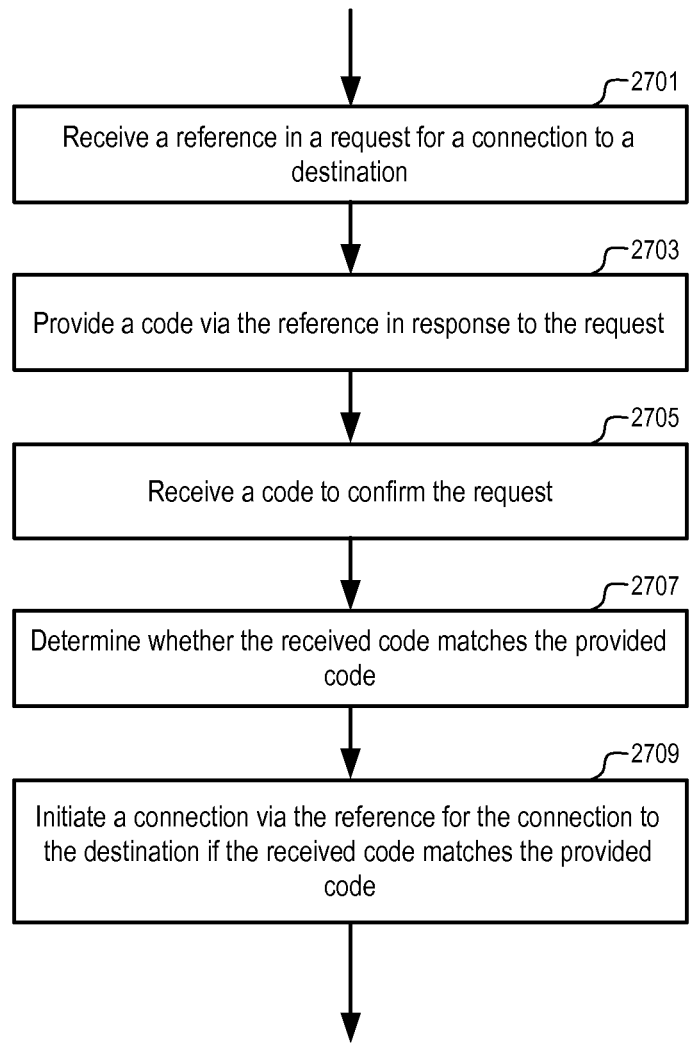
FIG. 27 shows a method to confirm a callback according to one embodiment.

FIG. 27 shows a method to confirm a callback according to one embodiment of the disclosure. In FIG. 27, a reference (e.g., a phone number) is received (2701) in a request for a connection to a destination (e.g., a phone connection). The connection to the destination is to be established via calling back the requester according to the reference (and calling the destination). In response to the request, a code is provided (2703) via the reference. A code is then received (2705) to confirm the request. It is determined (2707) whether the received code matches the provided code. If the received code matches the provided code, a connection is initiated (2709) via the reference for the connection to the destination.

In one embodiment, the callback reference includes a session initiation protocol (SIP) address or a uniform resource identifier (URI) (e.g., for a voice connection, for an instant messaging connection, etc.).

In one embodiment, the code can be provided via the reference through a data channel addressed to the reference, such as short message service (SMS), or an address (e.g., an email address, an instant messaging identifier) determined according to the reference. In one embodiment, the code is provided to the address as presence status information.

In one embodiment, the code can be provided as a Completely Automated Public Turing test to tell Computers and Humans Apart (CAPTCHA), in a text format, an audio format, a voice format, or a video format.

In one embodiment, the provided code and the received code are determined to be matching with each other when the provided code and the received code are the same.

In another embodiment, the provided code and the received code are determined to be matching with each other when the provided code and the received code have a predetermine relation but are not the same. For example, the received code may be required to be one increment above the provided code.

In one embodiment, an instruction to manipulate the provided code to generate the code that is to be sent back to the connection provider for conformation is provided with the confirmation code. In one embodiment, the instruction to manipulate the provided code to generate the code that is to be sent back to the connection provider for conformation is provided in the click to call interface.

In one embodiment, the instruction is provided to prevent a machine from making the request without a human behind it. Thus, the conformation process can also be used to verifying that the request is from a human user.

In one embodiment, the confirmation code is sent in the form of a Completely Automated Public Turing test to tell Computers and Humans Apart (CAPTCHA). For example, random words or letters are displayed in a distorted fashion so that they can be recognized by people, but not by software. The tests are typically formulated to require a solution to a difficult problem in the field of artificial intelligence (AI) to compile a software which could pass the tests.

In one embodiment, the confirmation code is sent in a text format according to the reference received. Alternatively, the confirmation code may be sent via voice mail, audio signal, image, video clip, etc.

Figure 28:
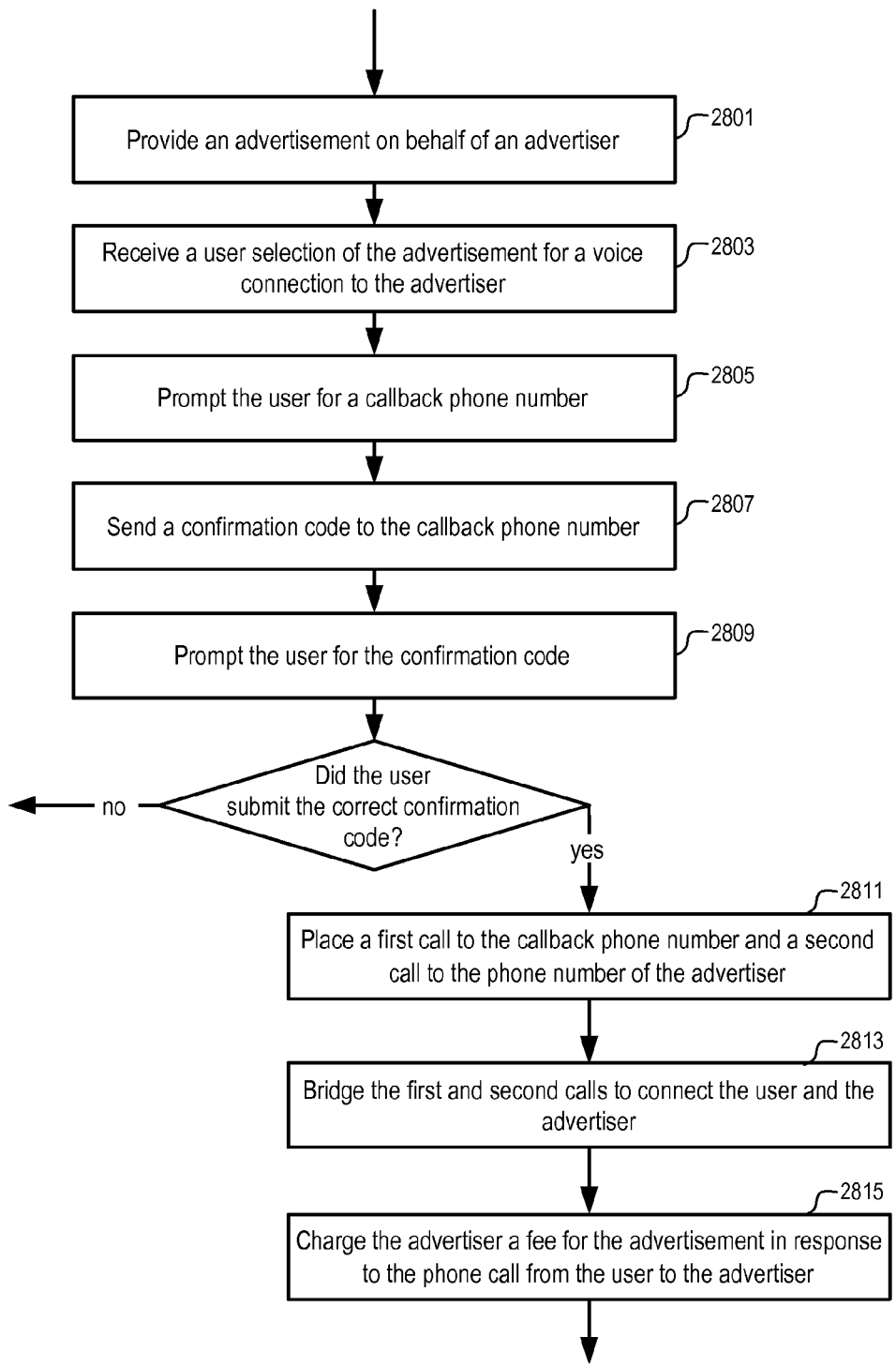
FIG. 28 shows a method to confirm a callback for voice connection to an advertiser according to one embodiment.

FIG. 28 shows a method to confirm a callback for voice connection to an advertiser according to one embodiment of the disclosure. In FIG. 28, an advertisement is provided (2801) on behalf of an advertiser. A user selection of the advertisement for a voice connection to the advertiser is received (2803). The user is prompted (2805) for a callback phone number. After receiving the callback phone number, a confirmation code is sent (2807) to the callback phone number (e.g., via SMS, or email, or a status indicator). The user is then prompted (2809) for the confirmation code.

It is then determined whether the user submitted the correct confirmation code. If the confirmation code received from the user is correct, a first call is placed (2811) to the callback phone number and a second call to the phone number of the advertiser. The first and second calls are bridged (2813) to connect the user and the advertiser. The advertiser is charged (2815) a fee for the advertisement in response to the phone call from the user to the advertiser.

If the confirmation code received from the user is correct, the callback is not initiated. The user may resubmit the confirmation code or make a correction to the callback number.

In one embodiment, a connection provider system determines whether a source of a call request is on a directory of blocked entities before initiating a call in response to the call request. The source may be an IP address for the initiation of a request for callback, for the initiation of a VoIP-based call, for the initiation of an instant messaging session, etc. The source may be a callback phone number, a phone number or an email address from which a call request is received. The source may be a user identifier of the caller, or a credit card number of the caller, or a digital certificate of the caller. In one embodiment, the system can detect an abnormal usage pattern associated with a source of call requests and put the source on the directory of blocked entities; alternatively or in combination, the system can receive indication from callees to identify the calls that are received from the system as a result of the call requests from the sources and thus identify the sources for blocking; alternatively or in combination, the system can receive instructions from callees for blocking incoming calls from the system under certain conditions (e.g., for a time period specified by a callee). In one embodiment, a caller can circumvent the call blocking and/or remove the source associated with the caller from the directory of blocked entities by performing certain actions, such as providing a code obtained from the system or from an advertisement, passing a Completely Automated Public Turing test to tell Computers and Humans Apart (CAPTCHA), talking to an operator, providing an identity through registering with or logging into the system, paying a fee, etc.

For example, the system can block specific callers based on identifications of the callers, such as the phone number from which the call is initiated (e.g., the phone number determined using the ANI service), the IP address from which the request for call is initiated (or from which a VoIP-based call is initiated). The system may block calls based on a time schedule, the volume of calls to a specific callee and/or the volume of calls initiated from a specific caller, etc. For example, the system may block calls based on a set of conditions, such as blocking specific callers according to a time schedule for a specific callee, blocking all callers to a callee when the number of calls to the callee exceeds a threshold during a time period, blocking a caller to a selected set of callees, or a category of callees or all callees, when the number of calls initiated from the caller exceeds a threshold, or when the number of calls initiated from the caller to a category of callees exceeds a threshold during a time period. The block may be enforced for a period of time and automatically removed. Alternatively or in combination, the block can be removed when the caller and/or callee can provide information to verify their identities and distinguish themselves from abusers.

Figure 29:
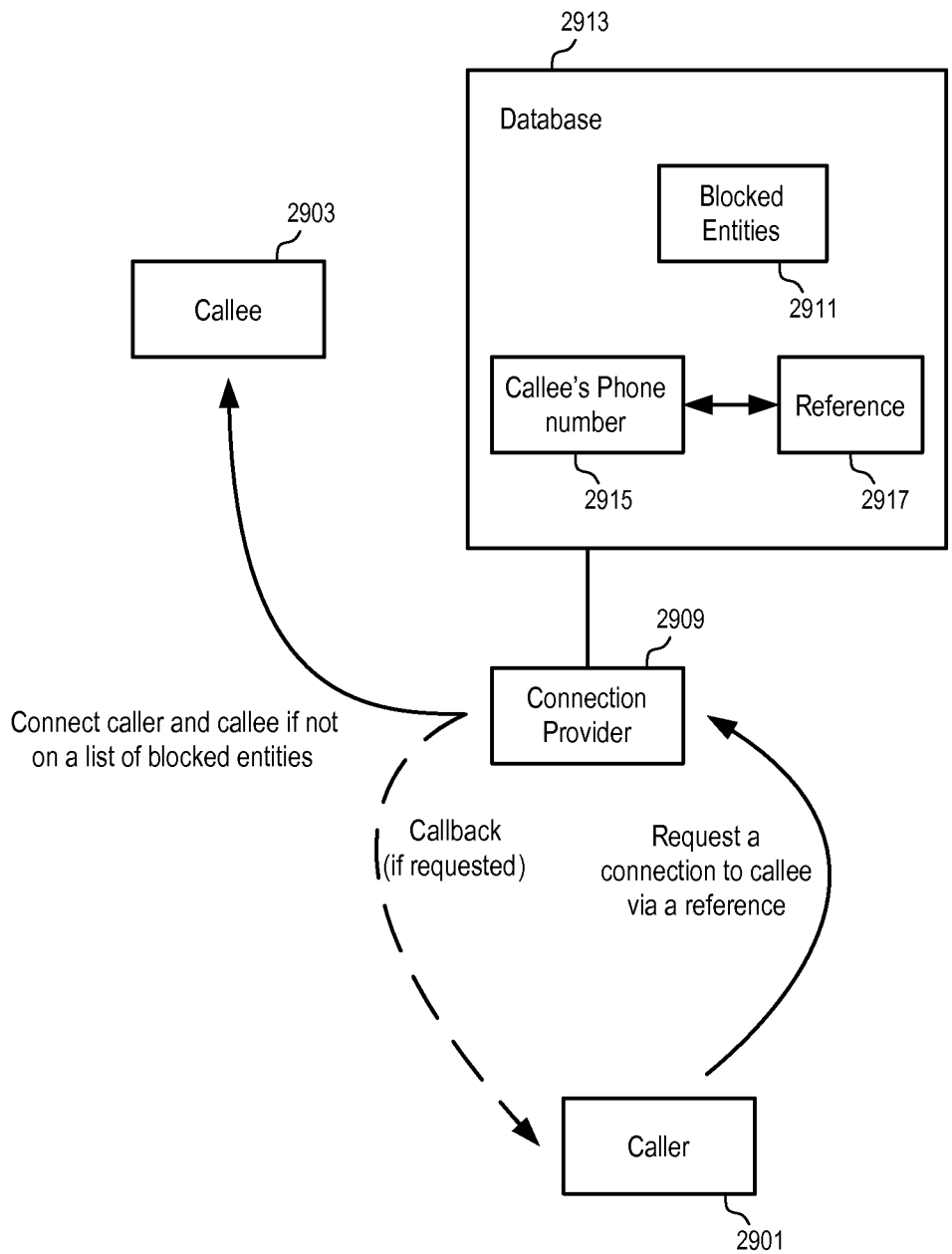
FIG. 29 illustrates a system to block calls from reaching a destination according to one embodiment.

FIG. 29 illustrates a system to block calls from reaching a destination according to one embodiment of the disclosure. In FIG. 29, a request for a telephone connection is initiated by a caller (2901) who sends a request to the connection provider via a reference (2917) that is associated with the phone number (2915) of the callee (2903). The request may be sent via a phone call to the connection provider (2909), via a selection of an icon or link provided in a web page (e.g., an advertisement, or a blog), via sending an email or SMS to the connection provider for a callback, via an instant message to the connection provider (2909), via a VoIP-based call to the connection provider (2909).

Although FIG. 29 illustrates the call process for a phone connection, the process can also be applied to calls for other types of communication sessions, such as a session for real time voice, text, video and/or image communications, or a session for non-real time communications (e.g., email, or SMS communications).

In FIG. 29, the caller (2901) does not have the phone number (2915) of the callee (2903). The caller (2901) requests the connection to the callee (2903) via a reference (2917) provided by the connection provider (2909). The reference (2917) may be provided in an advertisement presented on behalf of the callee (2903), or provided to the callee (2903) for distribution to customers (e.g., via a blog of the callee, or business cards).

For example, the reference (2901) can be a phone number of the connection provider assigned to the callee, such as a plain phone number (with or without extension), or a SIP phone number, or an instant messaging ID. Alternatively, the phone number may be a click-to-call reference for requesting a callback to the caller (2901) for a connection to the callee (2903).

In FIG. 29, the connection provider (2909) uses the reference (2917) to determine the callee's phone number (2915) using the database (2913). Alternatively, the reference (2917) may include an encoded/encrypted version of the phone number of the callee; and the phone number of the callee can be decoded/decrypted without relying on a database.

In FIG. 29, before the connection provider calls the callee (2903) using the callee's phone number (2915), which may be a plain phone number with or without an extension, or a SIP phone number, or a VoIP user ID, or a uniform resource identifier, the connection provider (2909) checks the blocked entities (2911) to determine whether the call should be blocked.

In one embodiment, if neither the callee's phone number nor the caller's phone number is on the list on the blocked entities, the connection provider (2909) initiates a call to the callee (2903) using the callee's phone number (2915) to provide a phone connection between the callee (2903) and the caller (2901). When a callback is requested, the connection provider (2909) also initiates a separate callback to the caller according to a callback number obtained from the caller (2901). The callback number may be obtained from the caller (2901) together with the request, or looked up from a database based on an identity of the caller (2901) or an identity of a device used by the caller (2901) to submit the request.

In one embodiment, when the caller (2901) receives the callback, the caller (2901) may be instructed to confirm the acceptance of the callback for a connection between the caller (2901) and the callee (2903). For example, the caller (2901) may be asked to press a key (e.g., "*" or "9"), or dial a sequence (e.g., "#99", or "*75", etc.), or provide a voice response (e.g., "yes" or "connect"), before the system further makes a connection to the callee (2903). Thus, the system can confirm that the caller (2901) is actually available before making a call to the callee (2903), reducing or eliminating the possibility of false calls to caller (2901).

In one embodiment, the instructions for the confirmation of the acceptance of the callback are provided over the callback connection between the caller (2901) and the connection provider (2909). Alternatively, the instructions for the confirmation of the acceptance of the callback are provided over a data connection as a response to the callback request. For example, if the callback request is received via a web request, the instruction can be provided via a web response. Further, in one embodiment, a different key (or sequence or the voice response) may be required for the acceptance for different callbacks requests. For example, the key, sequence or the voice response may be randomly selected for a callback request. In one embodiment, the required key, sequence or the voice response is presented in the form of a CAPTCHA test. For example, a distorted visual or audio presentation of a code can be provided as a response to the callback response; and the correct code is required over the callback connection to confirm the acceptance of the callback request. The CAPTCHA test can be provided in response to an indication of the lack of a human behind the callback request.

In one embodiment, the caller (2901) is required to stay connected for a period of time, after the caller (2901) receives the callback, before the system initiates the call to the caller (29013). For example, after the caller (2901) picks up the phone in response to the callback, the system presents a message to the caller (2901) over the phone connection between the caller (2901) and the connection provider (2909) (e.g., indicating that the callback in response to a request for a phone connection to the callee (2903)). If the caller (2901) fails to stay connected for the period of time, the system can avoid a false call to the callee (2903).

Alternatively or in combination, the caller may be asked to provide an indication if the callback is unwanted. For example, the caller (2901) may be asked to press a key (e.g., "#" or "1"), or dial a sequence (e.g., "#11", or "*99", etc.), or provide a voice response (e.g., "spam", or "wrong number", "block it"), if the caller (2901) did not request the callback.

In one embodiment, if the caller (2901) fails to provide the indication to confirm the acceptance of the callback for a connection between the caller (2901) and the callee (2903), or fails to stay connected for the period of time, or indicates that the callback is unwanted, the connection provider (2909) can put the source of the request for the callback on a block list to prevent future false callbacks to the caller (2901).

In one embodiment, the caller (2901) can request a phone connection without requesting a callback. For example, the caller (2901) can dial a phone number of the connection provider to request that the call be further connected to the callee. The connection provider can determined the callee based on the phone number dial the caller (2901) to reach the connection provider and/or an extension dialed by the caller. Alternatively, the caller may be prompt to identify the callee via an Interactive Voice Response (IVR) system, or a human operator based on a reference number or identifier provided in an advertisement. For example, the caller (2901) can make a VoIP-based voice connection (e.g., a SIP phone call, or a voice-based instant messaging call) to the connection provider to request the further connection to the callee (2903).

In one embodiment, the callee (2903) may request the connection provider to block incoming calls to the callee (2903) from the connection provider. For example, the callee (2903) may request the connection provider to block incoming calls for a certain period of time the day and/or on a certain day of the week. For example, the callee (2903) may request the connection provider to block further incoming calls when the callee (2903) has a predetermined number of received calls that have not yet been disconnected. For example, the callee (2903) may request the connection provider to block, for a period of time, repeated calls that have been previously disconnected by the callee for a conversation that was shorter than a threshold. In response to such request, the callee (2903) is added to the list of blocked entities (2911) with the corresponding conditions for the call blocking request. The callee (2903) may subsequently modify the call blocking request, or delete the call blocking request.

In one embodiment, the caller (2901) is identified and added to the blocked entities by the connection provider (2909). For example, the caller (2901) may be identified as a spammer who making indiscriminate calls that are generally unwanted by the corresponding callees. The caller (2901) may be identified based on an identification of the source of the request, such as the phone number (or IP address or email address or other types of addresses) from which the call or request is initiated, an identification of a device used by the caller to initiate the call or request, a callback phone number, a user ID that represents the caller (2901), a credit card number of the caller (2901), a financial account of the caller (2901), a personal identification number of the caller (2901), a digital certificate of the caller (2901), etc.

For example, the callback requests may be received via a web request (e.g., an HTTP request); and the IP address of the device may be used to identify the source. For example, the callback requests may be received via an email or SMS message; and the email address or the mobile phone number can be used to identify the source. In one embodiment, the caller is required to authenticate with the connection provide to request a phone connection with the callee; and the user identifier of the authentication system can be used to identify the source. In one embodiment, a source of payment information from the caller is required to connect the call to the callee; and the source of payment information (e.g., credit card number) can be used to identify the caller.

Spammers may be identified based on the call patterns and call history. For example, the frequency of callback requests initiated from a device can be used to determine whether the device is under the control of a spammer.

In one embodiment, when an abnormal call pattern is detected for calls from a source associated with the caller (2901), the calls from the source may be blocked for a specific callee (e.g., 2903) or a group of callees. For example, when the frequency of the calls initiated from the caller (2901) is above a threshold, the caller (2901) may be blocked. For example, when the call requests from a caller (2901) exceeds a threshold in a predetermined time period, the caller may be blocked for a period of time. For example, when the caller (2901) initiates more than a predetermined number of simultaneous calls, the caller (2901) may be blocked.

In one embodiment, a call blocking rule has an expiration time period. For example, when the caller (2901) accidentally initiates multiple simultaneous calls, the caller (2901) may be blocked for a period of time. After the expiration of the time period, the caller (2901) is allowed to make calls via the connection provider (2909) without further actions from the caller (2901).

In one embodiment, after a caller is blocked, the caller may use an authentication process to further provide an identity of the caller to avoid being blocked. For example, the caller may provide a pair of user name and password to verify an identity of the caller; after the successful authentication process, the caller can be considered as a different source; and if the caller as being identified by the user name is not on the list of blocked entities (2911), the call request can be accepted for a connection to the callee (2903). Thus, different users of a phone or a computer may make different requests, which can be selectively blocked based on the identities of the callers. For example, calls initiated from a public phone can be selectively blocked based on the identify of the callers; and the block for calls initiated from the public phone may be expired automatically after a period of time (e.g., one hour, or a day). In one embodiment, the time period to expiration increases as the number of previous blocks increase.

In one embodiment, the caller can provide a valid credit card number or a digital certificate to specifically identify the caller.

In one embodiment, the caller can pay a fee (e.g., to the callee and/or to the system) in a request associated with the source to ask the system to remove the source from the list of the blocked entities. In one embodiment, the fee may increase as the number of previous blocks increase to discourage spammers.

In one embodiment, when a source of a call is determined to be on a blocked list, the callers can be prompted to provide information to verify their identities. For example, the callers can be prompted to provide a credit card number, a pair of username and password, a pin number, an account number, a phone number, an email address, an instant messaging user ID, etc. In one embodiment, to verify that the caller is a human and/or the identity, the caller can be asked to pass a CAPTCHA test, and/or to receive a confirmation code via SMS (or via email or instant message or a voice mail or a callback to the caller) and provide the correct confirmation code back to the system.

In one embodiment, different prompts are played to the callers based on whether or not the source of the call is on a blocked list, the level of block if the source of the caller is on the blocked list.

In one embodiment, after the caller reveals more detailed identity of the caller (e.g., via an authentication process, a credit card number, a personal identification number, a digital certificate) to avoid being blocked, the caller is subsequently identified using such detailed/specific identification information, such as the user name, the credit card number, the personal identification number, the digital certificate, etc.

The source as represented by the detailed information can be further blocked, in response to abnormal usage pattern or requests from callees.

For example, a caller as identified using the user name, the credit card number, the personal identification number and/or the digital certificate can be subsequently identified as sources that need to be blocked. To further avoid being blocked, the caller may be required to pay a fee; and the fee may be increased as the block level increases. Alternatively, the caller may explain the situation to an operator to ask the operator to remove the block.

In one embodiment, the block level for a source can be decreased after a number of legitimate calls have been received from the source. For example, a caller at the source may present a detailed identity to avoid the block and to request a legitimate call to a callee. After making a number of legitimate calls from the source for one or more callers who have revealed their detailed identities, the block on the source may be removed.

For example, after an IP address of the caller's computer is on the list of the blocked entities, the caller may submit subsequent requests from the computer via an authentication process. After a period of operations from the computer, the system may determine that the risk of spamming from the computer is substantially reduced and thus remove the IP address of the caller's computer from the blocked entities. After the removal of the IP address of the caller's IP address from the list of blocked entities, the caller can make subsequent requests without going through the authentication process.

In one example, if a number of registered users using a computer having an IP address has been blocked for various reasons, subsequent registered users using the computer may be required to present a valid credit card number, and/or a digital certificate to identify themselves to avoid being blocked.

In one embodiment, the source of a call can also be identified via the identity of a distribution source that is responsible for delivering the communication reference (e.g., a phone number or a call button). For example, a phone number introduced to the caller via one entity may not be blocked, while the phone number introduced to the caller via another entity may be blocked. In one embodiment, the caller is prompted to identify the distribution source.

Alternatively, the distribution source may be identified automatically. For example, the referring URL of a call button can be used to determine identity of the distribution source of the call button. When a call button is selected in a browser, the browser sends the URL of the document that contains the call button, together with the request initiated through selection of the call button. Thus, the In one embodiment, the system can selectively block or allow the calls based on the identity of the distribution source and/or other conditions.

Thus, the system provides an hierarchical, flexible system to allow the removal of blocks by the callers themselves when they are blocked due to various reasons. By identifying the caller with varying degrees of certainty, the system can balance the convenience and privacy for the callers and the frequency of unwanted calls. The higher is the certainty requirement for identifying a caller, the higher is the deterrence to potential spammers. The lower is the certainty requirement for identifying a caller, the more convenient and private is the system for the caller.

Figure 30:
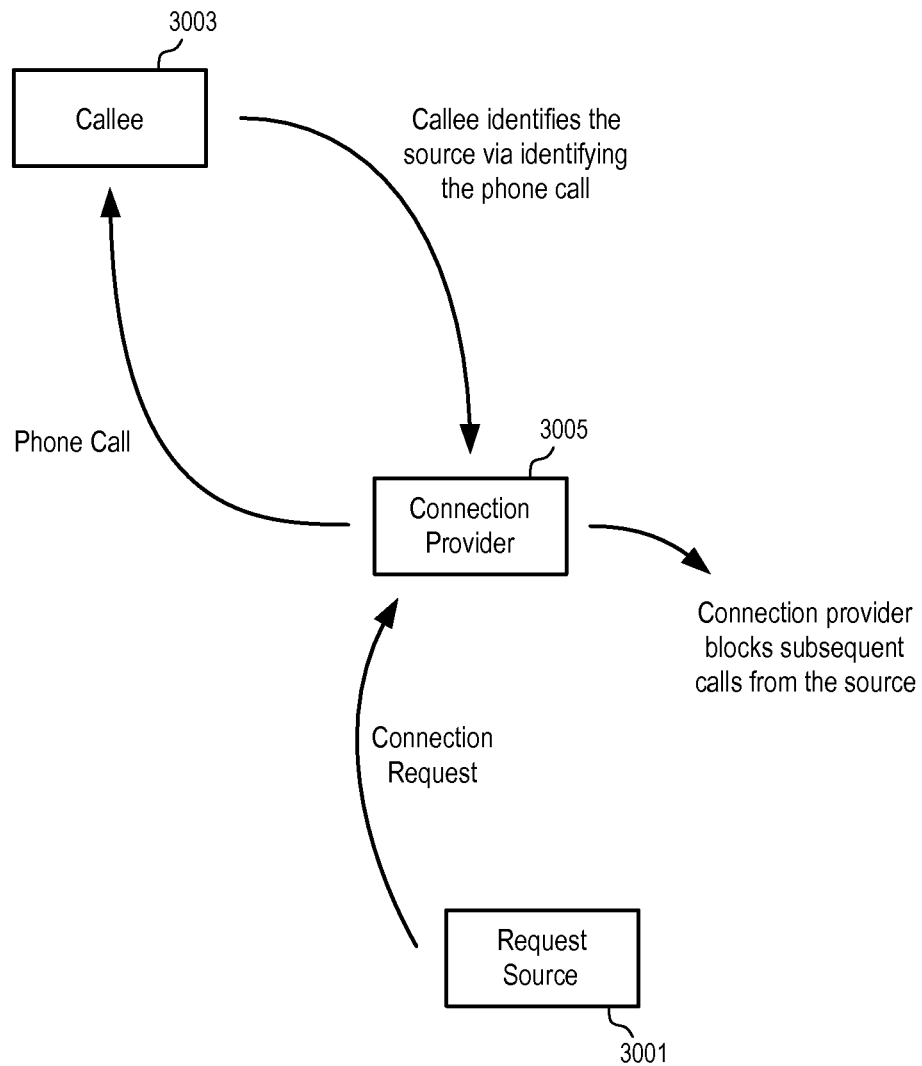
FIG. 30 illustrates a method to identify request sources for call blocking according to one embodiment.

FIG. 30 illustrates a method to identify request sources for call blocking according to one embodiment of the disclosure. In one embodiment, a callee (3003) can request the connection provider (3005) to block subsequent calls initiated from a request source (3001). After receiving a call from a connection provider (3005) that is in response to a request from the source (3001), the callee (3003) can request the connection provider (3005) to block subsequent calls that are initiated from the same source (3001) of the received call. The callee (3003) identifies the source (3001) via identifying the phone call that is received from the connection provider (3005). Based on the connection records, the connection provider (3005) can identify the source (3001) based on various information available to the connection provider (3005), such as the callback phone number of the caller, the phone number that initiated the call to the connection provider (3005), the IP address or email address that is used to initiate the callback request, the user name of the caller if the identity of the caller is authenticated, the credit card number of the caller, and/or a digital certificate of the caller, etc.

In one embodiment, connection provider (3005) maintain a record of identification information of the request source (3001) for a phone call that is placed by the connection provider (3005) to the callee (3003) in response to the request. If the callee requests the connection provider (3005) to block subsequent calls from the source, the connection provider (3005) generates a record in the list of blocked entities, based on the record of identification information of the request source. The list of blocked entities are checked for the subsequent call requests.

In one embodiment, the callee (3003) can instruct the connection provider (3005) to block subsequent calls from the source by dialing a sequence (e.g., "#99", or "*75", etc.) before the callee disconnects the phone connection between the callee (3003) and the connection provider (3005).

Alternatively, the callee (3003) can instruct the connection provider (3005) to block subsequent calls from the source by calling the connection provider after the callee disconnects the phone connection for the call from the caller. In one embodiment, the connection provider (3005) blocks subsequent calls from the source that initiated the last call to the callee (3003) via the connection provider (3005). In another embodiment, the callee can further indicate the call from the source by specifying the date and/or time of the call that is received from the connection provider (3005). For example, the callee (3003) may be connected to an operator or an interactive voice response (IVR) system to provide input to identify the call that is received from the source via the connection provider (3005).

Alternatively, the callee (3003) may use other communication channels to request the connection provider (3005) to block the request source (3001). For example, the callee (3003) may use a web interface to submit the request to block the source (3001); or the callee (3003) may send an email or SMS message to the connection provider (3005) to submit the request to block the source (3001).

In one embodiment, a user interface is provided via a data connection between the callee (3003) and the connection provider (3005) while the phone connection between the callee (3003) and the connection provider (3005) is maintained for the request from the source (3001). For example, the user interface may be a web page including a link or icon which can be selected to block further calls from the request source (3001), with or without disconnecting the current phone connection between the callee (3003) and the caller.

In one embodiment, the callee (3003) can further indicate a reason for blocking the source; and the connection provider (3005) can determine whether to block the source for calls to other callees, based on the reason provided by the callee (3003). For example, if the callee simply does not want to receive subsequent calls from the caller, the caller may be allowed to call other callees via the connection provider. However, if the callee identifies the caller as a spammer, the connection provider may block call requests from the source from reaching the callee (3003) and other callees.

Since the callee (3003) may mistakenly identify the source (3001) as a spammer, or the source (3001) may be subsequently associated with a non-spammer (e.g., when the IP address is reassigned to a different user of a different computer), the system provides a way for the user at the source (3001) to avoid being blocked indefinitely without the need for further actions from the callee (3003). For example, the block may be set to expire in a period of time; for example, the callers may further identify themselves by providing personal identification information which a spammer would avoid. In one embodiment, when the callee (3003) indicates that the source (3001) is a spammer, the system can further determine the likelihood that the source (3001) is a spammer based on call activities that are associated with the source. Thus, a combination of the monitored call activities and input from the callees can be used to more reliably identify spam sources.

In one embodiment, a correct code may be required to avoid being blocked, or to have the corresponding source removed from the list of blocked entities. For example, a callee may specify a code for acceptance of incoming calls. The code can be provided in an advertisement presented on behalf of the callee, or be distributed by the callee. The caller may be required to present the code in a request for a connection to the callee. When the code is received, the call request is temporarily unblocked; or the source is removed from the list of blocked entities.

In another embodiment, the connection provider provides a code to determine whether there is a human behind the request. For example, in one embodiment, the code is presented in a way that is difficult for an automated computer process to recognize. For example, the code may include a Completely Automated Public Turing test to tell Computers and Humans Apart (CAPTCHA), in a text format, an audio format, a voice format, or a video format. If the caller fails to provide correct the code in the request for a connection, the request may be blocked; and the caller may be added to the list of blocked entities if the caller fails the test multiple times in a short time period.

In one embodiment, a callee can use a call management tool (e.g., similar to the user interface illustrated in FIG. 18) to selectively block subsequent calls from various sources. The call management tool can display an entry corresponding to a call that is currently connected to the callee; and the callee can select the entry to request a block on the source associated with the entry. In one embodiment, the call management tool can further display a pre-defined number of previously received calls or previously received calls within a pre-determined time period (e.g., within the last twenty four hours, or within the seven days, etc.) Using the call management tool, the callee can easily identify a source from which subsequent calls need to be blocked. In one embodiment, the callee can use the management tool to selectively display certain calls by specifying a profile (e.g., the call duration, a time window of the calls, etc.) and thus reduce the number of calls to be examined for the identification of calls that need to be blocked.

In one embodiment, an operator (or administrator) of the system can use a user interface to list calls and associated sources of the calls. Using the user interface, the calls need to be blocked (e.g., based on a complain from a callee, or abnormal usage patterns) can be identified. The sources of the calls can be then identified for blocking future calls from the identified sources. The sources may be identified based on the identifiers of the devices from which the calls or the request for calls are initiated (e.g., IP address, phone number, device serial number, etc.), the identifiers of the callers (e.g., PIN numbers, username, account number, credit card number, digital certification, etc.), and/or the referring distribution sources of the calls.

FIG. 31 illustrates rules to block calls according to one embodiment of the disclosure. The rules may be used to implement at least part of the list of blocked entities (2911) in the database (2913) in FIG. 29.

In FIG. 31, the rules may include a number of fields for the identification of call destinations (e.g., callee's user ID 3101 and callee's phone number 3102) and the fields for the identification of the request sources (e.g., caller's user ID 3103, caller's phone number 3104, caller's IP address 3105). A rule can have an expiration date and/or time (3106).

For example, when a callee A123 requests the connection provider to block a source, the connection provider may determine that that source is a request for callback to phone number 456-789-1234 and the callback request is received from IP address 178-25-3-12; thus, the system can add a rule including fields 3111-3116 to block the calls to callee A123 (3111) that are initiated from the IP address 178-25-3-12 (3115) and/or the phone number 456-789-1234 (3114). Further, if the callee A123 indicates that the received call is from a spammer, the rule including fields 3121-3126 is added to block calls from the phone number 456-789-1234 (3124).

For another example, if the connection provider detects abnormal call patterns associated with the phone number 456-789-1234, a rule including fields 3121-3126 can be added to block calls initiated from the phone number 456-789-1234 (3124).

For example, a user C821 calling from the phone number 456-789-1234 may avoid being blocked by providing the user ID C821 in an authentication process. If the call is connected to the callee B213 who subsequently requests the connection provider to block calls from the same source, a rule including fields 3131-3136 can be added to specifically block calls from the user C821 (3133) to the user B213 (3131).

In one embodiment, the callee may request the calls to a specific phone number of the callee be blocked while allowing calls to other phone numbers of the callee. For example, the rule including fields 3141-3146 can be added to specifically block calls from user C821 (3143) to the phone number 800-789-1234 (3142) of user D533 (3141).

In one embodiment, the methods to block calls to callees can also be used to block unwanted callbacks. For example, when the callback number belongs to a registered user of the system, the user may log into the system to view callback histories and request the system to block the sources of callback requests for subsequent callbacks. For example, before the phone connection between the connection provider and the recipient of the callback is disconnected, the recipient of the callback may dial a sequence (e.g., "**#") to instruct the connection provider to block subsequent callbacks initiated from the same source. For example, after the phone connection between the connection provider and the recipient of the callback is disconnected, the recipient of the callback may call the connection provider to block subsequent callbacks initiated from the source, such as the last callback from the connection provider or a callback as identified by the caller based on an indication of the date and/or time of the callback. To remove a block, the caller can make a call to the connection provider to explicitly identify a source that is to be allowed for the initiation of callbacks. Alternatively, the caller may submit a code to the connection provider to allow the connection provider to remove blocks on sources which can provide the correct code with the call request.

Figure 32:
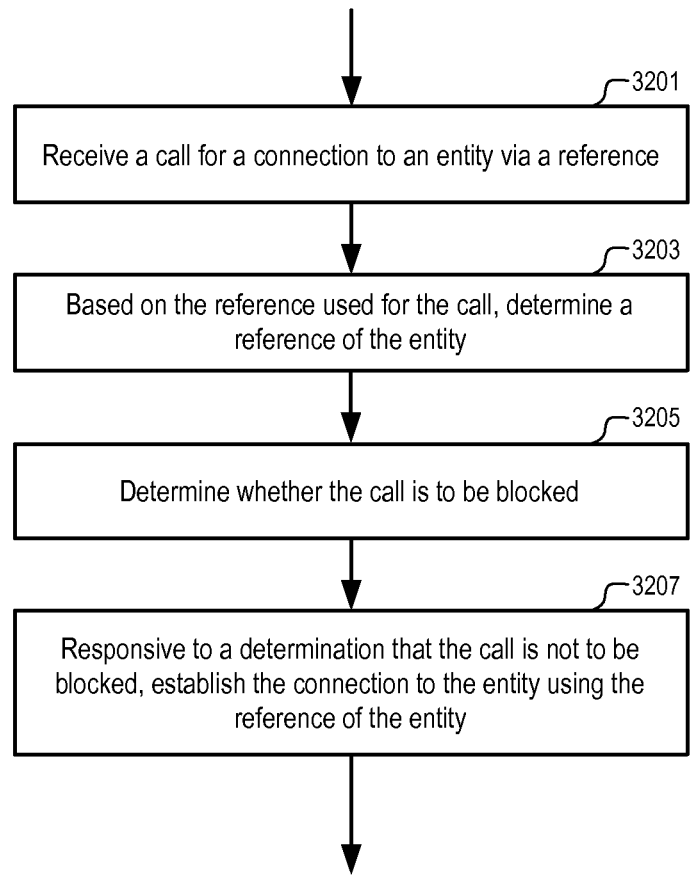
FIG. 32 shows a flow diagram of a method to connect calls according to one embodiment.

FIG. 32 shows a flow diagram of a method to connect calls according to one embodiment of the disclosure. In FIG. 32, a call for a connection to an entity is received (3201) via a reference; based on the reference used for the call, a reference of the entity is determined (3203); it is determined (3205) whether the call is to be blocked; and responsive to a determination that the call is not to be blocked, the connection to the entity is established (3207) using the reference of the entity. In one embodiment, the connection is established to facilitate two-way communications in real time in at least one of voice, text, image, video, and audio.

In one embodiment, the reference used for the call includes a phone number of a service provider; and the reference of the entity includes a phone number of the entity. For example, the phone number of the service provider may include a Session Initiation Protocol (SIP) Uniform Resource Identifier (URI), or an extension to be dialed in Dual Tone Multi-Frequency (DTMF), or an extension to be provided via an interactive voice response system. In one embodiment, the reference used for the call includes a communication address of a service provider; and the reference of the entity includes a communication address of the entity.

In one embodiment, whether the call is to be blocked is determined without using the reference of the entity. For example, whether the call is to be blocked can be determined based on a pattern of call requests initiated from a source, such as a frequency of call requests initiated from the source. The source may be an Internet Protocol (IP) address, a phone number, or a user identifier.

In one embodiment, whether the call is to be blocked is determined based on the reference of the entity and a source of a request for the call.

In one embodiment, responsive to an indication from the entity, subsequent calls from the source for connections to the entity are blocked. In one embodiment, a requester from the source is authenticated for subsequent calls for connections after the indication received from the entity. In one embodiment, calls from the source for connections to the entity are unblocked after a predetermined period of time since the indication.

In one embodiment, the reference used for the call is provided in an advertisement. The call is in response to the advertisement. The connection is established between the entity and a requester of the call without authenticating the requester. And, the entity is charged for the advertisement based on a count of one or more connections made to the entity via the reference provided in the advertisement.

In one embodiment, the reference is provided to the entity for distribution to customers. A source of payment is verified prior to establishing the connection to the entity. And, the source of payment is charged on behalf of the entity for a period of communication time with the entity over the established connection.

Figure 33:
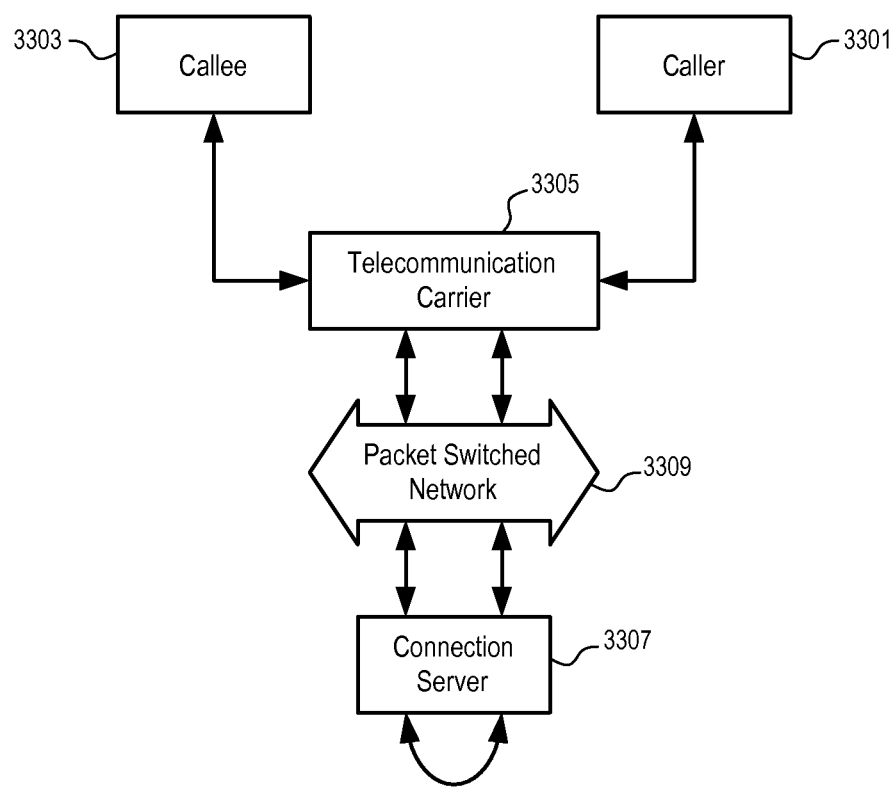
FIG. 33 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 33. In FIG. 33, the connection server (3307) receives and/or places telephone calls via the telecommunication carrier (3305) over the packet switched network (3309). The telecommunication carrier (3305) further routes the telephone communications towards the caller (3301) and the callee (3303).

Since the telecommunication carrier (3305) can route a call from a packet switched network to a variety of destinations (e.g., a traditional analog telephone set, a mobile phone, a cellular phone, a WiFi phone, a Bluetooth phone, a softphone running on a computer, etc.), the connection sever (3307) can use one type of communication connection with the telephone carrier (3305) to facilitate the communication connections with variety of devices used by the customers (e.g., callers and callees). Thus, the implementation of the connection server (3307) can be simplified. In one embodiment, the connection server (3307) can also place and/or receive direct VoIP calls to/from the caller (or callee).

For example, to make a voice connection in response to a click-to-call request, the connection server can place separate VoIP calls, via the telecommunication carrier (3305), to the caller (3301) (e.g., the requester of the click-to-call) and the callee (3303) (e.g., the destination of the click-to-call request).

If the caller (3301) (or the callee 3303) is on a public switched telephone network (PSTN), the telecommunication carrier (3305) bridges the packet switched network and the public switched telephone network (PSTN). The telecommunication carrier (3305) routes the call from the packet switched network (3309) to the caller (3301) (or the callee 3303) on the circuit switched network. Thus, the caller (3301) (or the callee 3303) can use a telephone set to receive the call via a Plain Old Telephone Service (POTS). The connection server (3307) joins the separate calls that are placed via the packet switched network (3309) to connection the callee (3303) and the caller (3301).

In one embodiment, call signaling and media content may use different network paths. While call signaling is arranged to go through the packet switched network (3309) and the connection server (3307), the media stream does not have to go through the connection server (3307). For example, when the calls are joined, the media content may be redirected to flow over the communication carrier (3305) without going through the packet switched network (3309) to the connection server (3307) for improved performance and efficiency. The connection server (3307) can release the control over the media stream to allow the media stream to flow through the shortest path, without going through the connection server, while maintaining control to the connection for the call by staying on the path for call signaling.

In another example, when the caller (3301) initiates a call over a PSTN to the connection server (3307), the telecommunication carrier (3305) converts the call for the packet switched network (3309) for the connection server (3307).

In one embodiment, virtual softphones on the telecommunication carrier (3305) are assigned to the caller (3301) and the callee (3303) for interfacing with the connection server (3307) over the packet switched network (3309). The virtual softphones encapsulates the devices and networks used by the caller (3301) and callee (3303) to access the connection server (3307); and the telecommunication carrier (3305) shields the connection server (3307) from the implementation details of the user devices and networks used by the caller (3301) and the callee (3303). The connection server (3307) calls (or receives calls from) and connects the virtual softphones on the telecommunication carrier (3305) to connect the caller (3301) and the callee (3303).

In FIG. 33, the telephone connection between the telecommunication carrier (3305) and the connection server (3307) is facilitated via a packet switched network (3309). Thus, the connection server (3307) can operate efficiently in a digital domain. The connection server (3307) interfaces with the telecommunication carrier (3305) using one type of Internet Telephony systems (e.g., SIP-based Internet telephony).

Alternatively, a connection server may include some or all of the functionality of the telecommunication carrier (3305). For example, the connection server may be configured to bridge a packet switched network and a circuit switched network. The connection server may support multiple, different types of Internet Telephony systems.

In one embodiment, the connection server (3307) and the telecommunication carrier (3305) are operated by different, separate entities. Alternatively, the connection server (3307) and the telecommunication carrier (3305) may be operated by the same entity. In another embodiment, the telecommunication carrier (3305) includes a set of facilities operated by a number of separate entities.

In one embodiment, the caller (3301) and/or the callee (3303) may also place/receive calls via a packet switched network. The telecommunication carrier (3305) may route the calls between the caller (3301) and the callee (3303) without using a PSTN. In one embodiment, caller (3301) and/or the callee (3303) may place calls to or receive calls from the connection server (3307) via Internet.

Figure 34:
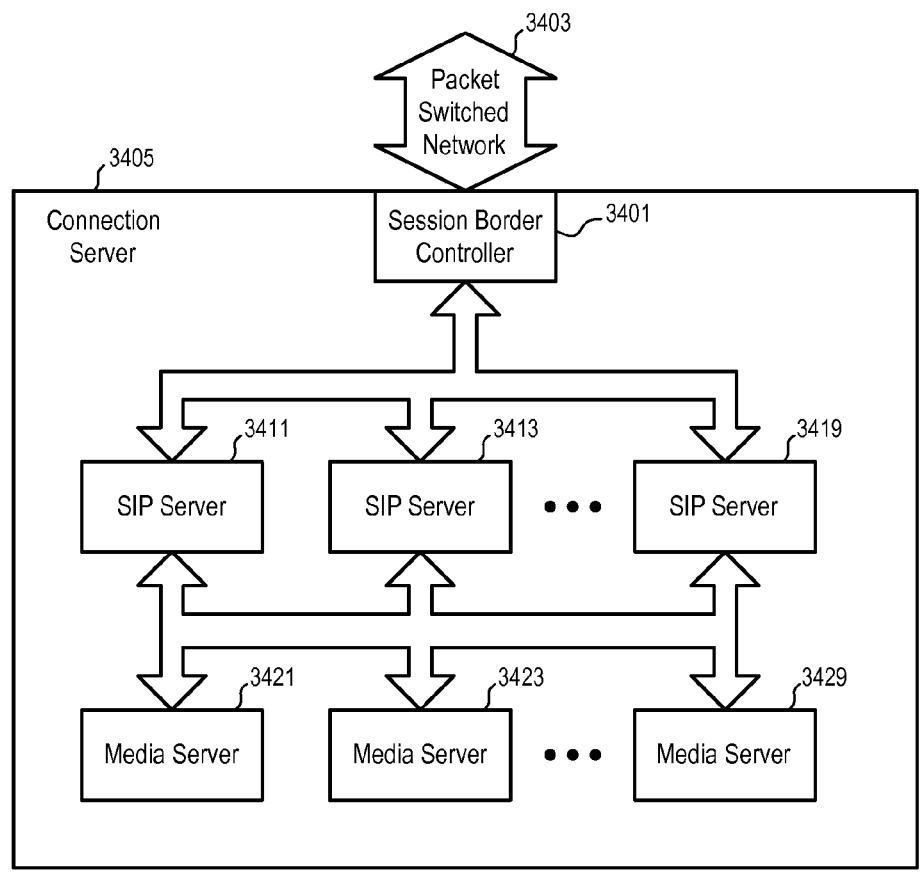
FIG. 34 shows a connection server according to one embodiment.

FIG. 34 shows a connection server according to one embodiment. In FIG. 34, the connection server (3306) is configured to place and/or receive VoIP calls using Session Initiation Protocol (SIP). A session border controller (3401) is used to interface with the packet switched network (3403) and control the types of network traffic related to VoIP calls that might go into the connection server (3405).

In one embodiment, the session border controller (3306) is configured to control the signaling and media stream during the setting up, conducting and tearing down of VoIP calls to or from the connection server (3405). In some embodiments, the session border controller (3306) may pick up the call that comes to the session border controller (3306), places a separate call from the session border controller (3306), and joins the received call and the placed call to control both the signaling and media stream. In some embodiments, the session border controller (3306) may perform signaling/encoding translation to allow the connection server (3405) to process the VoIP calls in one standard, while receiving VoIP calls in a variety of standards (e.g., SIP, H.323, etc.). In one embodiment, the session border controller (3306) is configured to perform one or more firewall functionalities, such as denial of service protection, call filtering, bandwidth management, etc.

In one embodiment, the session border controller (3306) is configured to perform media releasing operation. When the session border controller (3306) determines that the source and destination of a media stream is on the same side of the session border controller (3306) (e.g., both the source and the destination of the media stream is outside the connection server 3405), the session border controller (3306) can release the hairpinning of the media stream and allow the media stream to flow without going through the session border controller (3306).

In FIG. 34, a set of SIP servers (e.g., 3411, 3413, ..., 3419) are networked to the session border controller (3401) to receive messages for incoming calls and to initiate outgoing calls. The session border controller (3401) is configured to evenly distribute the calls for processing by the SIP servers.

For example, when an incoming message for the initiation of a call is received (e.g., a SIP INVITE message from the telecommunication carrier 3305), the session border controller (3401) may route it to a SIP server (e.g., 3411) for processing. The INVITE message includes the phone number dialed by the caller and the contact information about the caller (e.g., the phone number of the caller 3301 and/or the identity of the virtual SIP phone at the telecommunication carrier 3305).

The SIP server may determine whether the phone number dialed by the caller (3303) is sufficient to determine the phone number of the callee (e.g., 3303). If the phone number of the callee (e.g., 3303) can be determined from the phone number dialed by the caller (3303) (e.g., via decoding the phone number dialed by the callee, or looking up the phone number of the callee from a table using the phone number dialed by the caller as a key), the SIP server can place a separate SIP call to the callee via the packet switched network (3403) and then connect the caller and the callee. Alternatively, the SIP server can further route the SIP INVITE message (e.g., to the telecommunication carrier (3305) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (3421) (or a virtual softphone on SIP server) as the initiator for a separate call. The SIP server then connects the calls for the media stream.

In one embodiment, the caller is first connected to a media server (e.g., 3421, 3423, or 3429). For example, the SIP server may forward the SIP INVITE message to one or more of the media servers for answering the call. When a media server (e.g., 3421) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (3403) (e.g., by sending a SIP INVITE message to the telecommunication carrier 3305, which further bridges the call to the callee 3303). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (3401) into the connection server (3405). For example, the media stream can go through the telecommunication carrier (3305) in FIG. 33 without going to the connection server (3307) after the SIP server connects the caller and the callee.

However, the SIP server stays on the signaling path to monitor the progress and termination of the call. The SIP server can also break the connection between the caller and the callee, or force the media stream to come through the connection serve (3405). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (3403) for a connection to the caller. The SIP call may be bridged onto a circuit switched network (e.g., by a telecommunication carrier 3305). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (3411, 3413, ..., 3419) and media servers (3421, 3423, ..., 3429) are implemented on separate computers connected via a local area network (and/or intranet or Internet). Alternatively, at least the some of the servers can be implemented on a same computer. In one embodiment, the SIP servers and the media servers are also integrated with the session border controller (3401) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (3405) may further include a database server (3405) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figure 20:
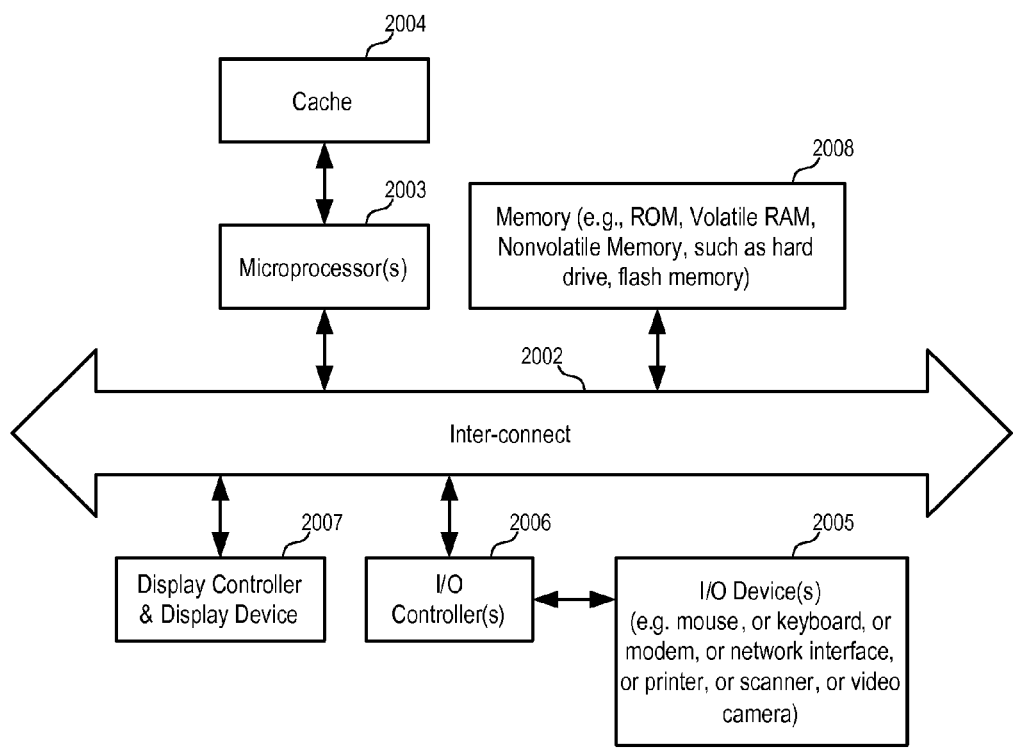
FIG. 20 shows a block diagram example of a data processing system which may be used in various embodiments.

FIG. 20 shows a block diagram example of a data processing system which may be used in various embodiments. While FIG. 20 illustrates various components of a computer system, it is not intended to represent any particular architecture or manner of interconnecting the components. Other systems that have fewer or more components may also be used.

In FIG. 20, the communication device (2001) is a form of a data processing system. The system (2001) includes an inter-connect (2002) (e.g., bus and system core logic), which interconnects a microprocessor(s) (2003) and memory (2008). The microprocessor (2003) is coupled to cache memory (2004) in the example of FIG. 20.

The inter-connect (2002) interconnects the microprocessor(s) (2003) and the memory (2008) together and also interconnects them to a display controller and display device (2007) and to peripheral devices such as input/output (I/O) devices (2005) through an input/output controller(s) (2006). Typical I/O devices include mice, keyboards, modems, network interfaces, printers, scanners, video cameras and other devices which are well known in the art.

The inter-connect (2002) may include one or more buses connected to one another through various bridges, controllers and/or adapters. In one embodiment the I/O controller (2006) includes a USB (Universal Serial Bus) adapter for controlling USB peripherals, and/or an IEEE-1394 bus adapter for controlling IEEE-1394 peripherals.

The memory (2008) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 20 is used as one of the communication server(s), connection server(s), database server(s), media server(s), controller(s), router(s), gateway(s), etc.

Further, a user terminal as a client system can be a data processing system similar to the system of FIG. 20. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone. Alternatively, the traditional communication client(s) may be used in some embodiments.

Figure 35:
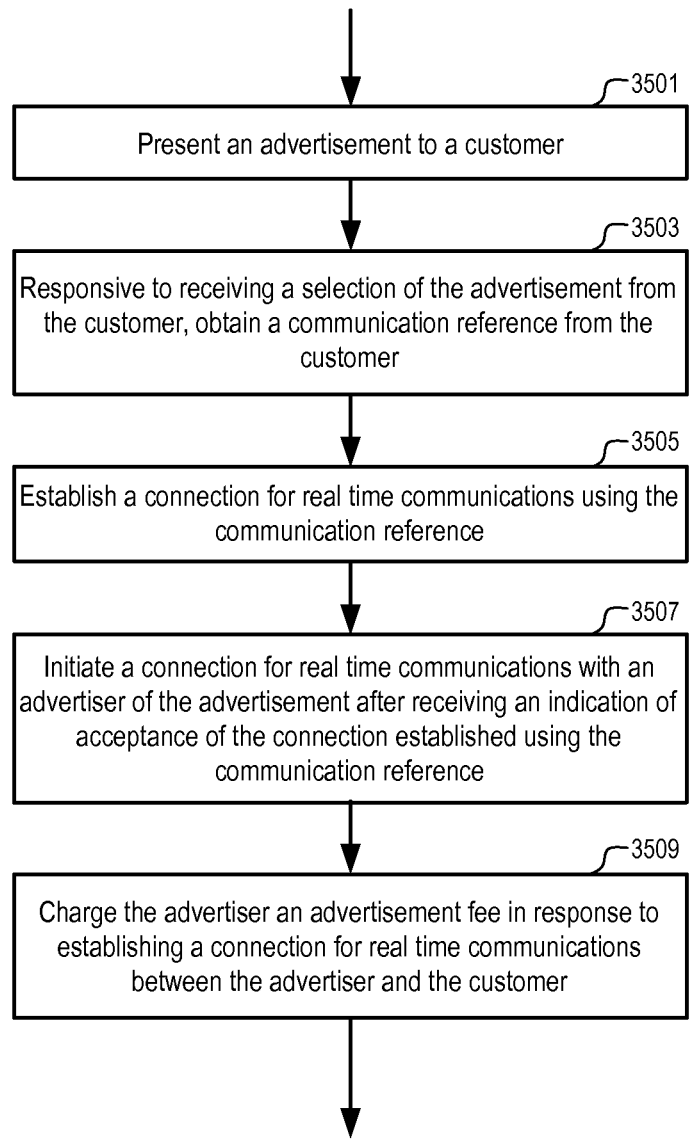
FIG. 35 shows a method to connect a customer to an advertiser via callback acceptance according to one embodiment.

FIG. 35 shows a method to connect a customer to an advertiser via callback acceptance according to one embodiment. In FIG. 35, an advertisement is presented (3501) to a customer (e.g., via a web page, a blog, an email, interactive television, a game console, etc.). In one embodiment, the advertisement includes an interactive user interface element, such as a click-to-call icon, which is selectable by the customer. Responsive to receiving a selection of the advertisement from the customer, a communication reference is obtained (3503) from the customer, such as a telephone number of the customer's landline phone or cellular phone, or a user identifier of an instant messaging system, etc.

In FIG. 35, a connection for real time communications is established (3505) using the communication reference. A connection for real time communications with an advertiser of the advertisement is initiated (3507) after an indication is received to accept the connection that is established using the communication reference. In one embodiment, the acceptance requires explicit input for the customer over the established connection. This arrangement avoids or reduces false calls for connections to the advertiser, if the request associated with the received communication reference can not be verified.

In FIG. 35, the advertiser is charged an advertisement fee in response to establishing a connection for real time communications between the advertiser and the customer. The advertisement fee may be charged per the connection between the advertiser and the customer. For example, the advertiser may offer a fixed bid price, or a maximum bid price, for the advertisement fee, which can be used by the system to prioritize the presentation of advertisements for different advertisers. Alternatively, the advertiser may be charged a subscription for a number of connections with different customers. Alternatively or in combination, the advertiser may be charged a communication fee based on the duration of the connection between the customer and the advertiser. In one embodiment, the advertiser delivers services/information over the connection established between the customer and the advertiser; and the system charges the customer on behalf of the advertiser (e.g., an advisor).

In one embodiment, the communication reference includes a telephonic reference, such as a telephone number without an extension, a telephone number with an extension, a Session Initiation Protocol (SIP) Uniform Resource Identifier (URI), an instant messaging user identifier, a Voice over Internet Protocol (VoIP) user identifier; and the connection for real time communications between the advertiser and the customer includes a telephone connection for telephone conversation.

For example, to establish the connection for real time communications using the communication reference, a connection server can establish a first Voice over Internet Protocol (VoIP) connection with a telecommunication carrier which bridges the first VoIP connection to a public switched telephone network (PSTN) according to communication reference. To initiate the connection for real time communications with the advertiser, the connection server can place a second Voice over Internet Protocol (VoIP) call to a telecommunication carrier which bridges the second VoIP call to a public switched telephone network (PSTN) to the advertiser. The first VoIP connection and the second VoIP call are then bridged to connect the customer and the advertiser.

In one embodiment, a first virtual softphone terminates the first VoIP connection for bridging onto a public switched telephone network (PSTN); a second virtual softphone terminates the second VoIP call for bridging onto a public switched telephone network (PSTN); and the connection server directs the first softphone and the second softphone to establish a direct media connection that does not go through the connection server to connect the advertiser and the customer.

In one embodiment, the connection provider optionally provides language translation and/or format conversion to bridge the connections. For example, the connection provider may translate a message from a first spoken language to a second spoken language for transferring the message from the first connection to the second connection. For example, the connection provider may convert a message between text and voice to bridge the connections. For example, one of the caller and callee may receive and send communicates in text; and the other may receive and send communications in voice; and the connection provider can perform conversion via speech recognition and text to speech synthesizer or via a human operator. For example, an automated translation software or a human operator can perform the language translation for the caller and callee who speaks different languages.

In one embodiment, an audio signal generated from pressing one or more keys on a phone over the connection established using the communication reference, such as a Dual-Tone Multi-Frequency (DTMF) signal, can be used to indicate the acceptance of the connection. Alternatively, the acceptance may be received in voice commands via an interactive voice response (IVR) system.

In one embodiment, a code is provided to the customer; and the system determines whether the audio signal matches with the code. The connection established using the communication reference is verified when the audio signal matches with the code.

In one embodiment, the code is provided as a Completely Automated Public Turing test to tell Computers and Humans Apart (CAPTCHA), which may be provided via a distorted display of the code via the communication channel to obtain the communication reference of the customer. Alternatively, the code can be provided to the customer over the communication connection established via the obtained communication reference of the customer.

In one embodiment, the code is provided via a connection separate from the connection for real time communications established using the communication reference (e.g., via an email, an SMS/MMS message, an instant message, etc.). In one embodiment, the code is provided prior to the establishing of the connection for real time communications using the communication reference.

In one embodiment, an audio advertisement for the advertiser is provided over the connection established using the communication reference; the customer may indicate the acceptance of the callback via maintaining the connection established using the communication reference until after a completion of the audio advertisement transmitted over the connection established using the communication reference.

In one embodiment, after the customer is called back, the customer is connected to an interactive voice response (IVR) system. The customer may be prompted to provide subcategories of desired services and/or other information that may be of value to the advertiser. The collected information may be used to further select a specific advertiser (e.g., when the advertisement precariously presented to the customer was for a group of advertisers who offers similar products and/or services).

In one embodiment, one or more subsequent selections of advertisements from the customer to request connections are blocked if an indication of rejecting the connection established using the communication reference is received. For example, information available to identify the customer can be placed on a blocked list to block subsequent requests for connections.

In one embodiment, the customer can be automatically unblocked after a predetermined period of time. In one embodiment, further detailed identification information of the customer can be requested by the system and submitted from the customer to avoid the block for subsequent requests after an indication is received to reject the connection that was established using the communication reference.

Figure 36:
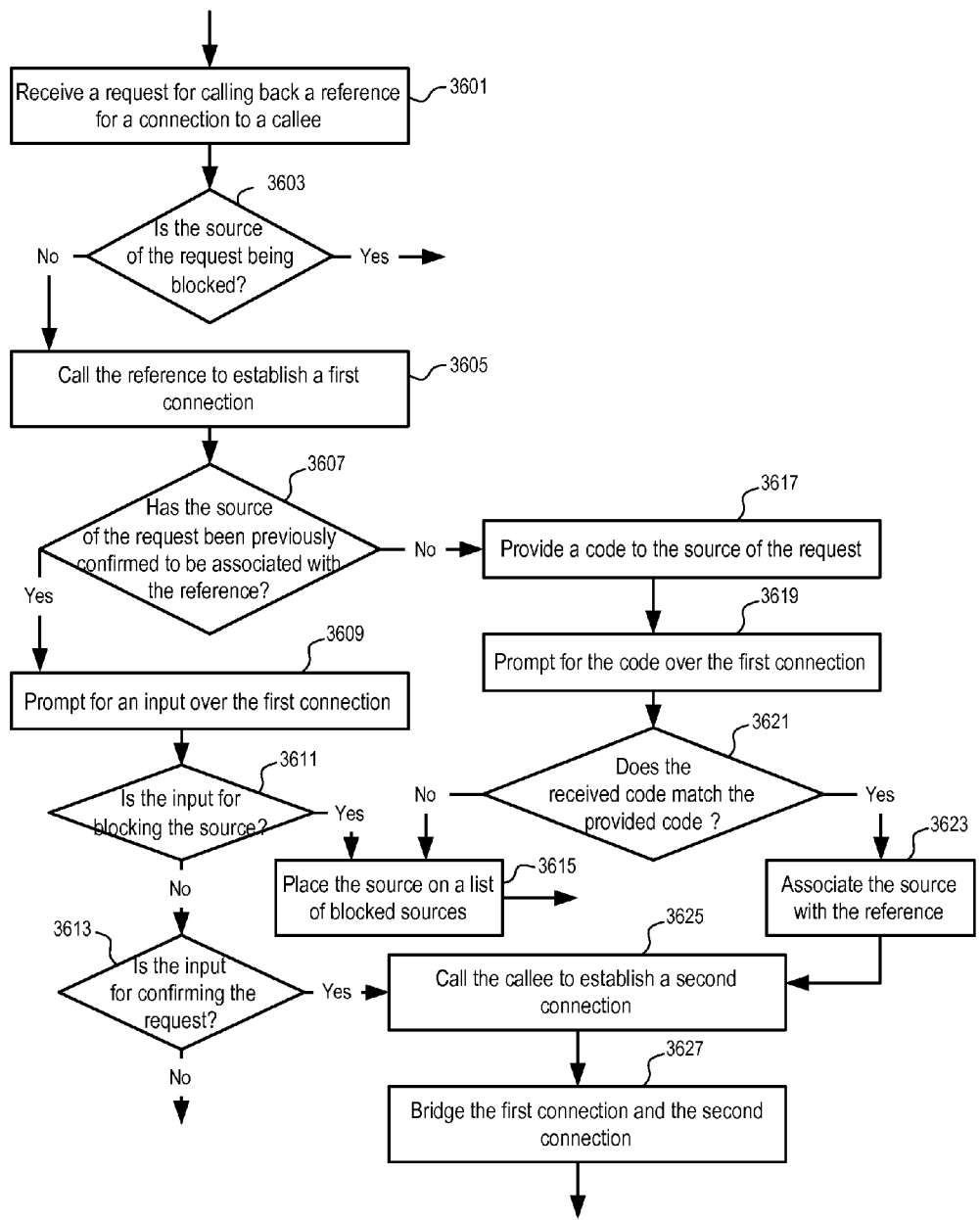
FIG. 36 shows a method to selectively block calls resulting for callback requests according to one embodiment.

FIG. 36 shows a method to selectively block calls resulting for callback requests according to one embodiment. In FIG. 36, after a request for calling back a reference for a connection to a callee is received (3601), it is determined (3603) whether the source of the request is being blocked. If the source of the request is on a blocked list, the customer may provide further detailed information to avoid the block or wait for a period of time until the automatic expiration of the block. If the source of the request is not being blocked, a connection provider calls (3605) the reference to establish a first connection.

In FIG. 36, it is determined (3607) whether the source of the request has been previously confirmed to be associated with the reference. If the source has not been previously confirmed to be associated with the reference, a code is provided (3617) to the source of the request; and the customer is prompted (3619) for the code over the first connection.

In one embodiment, the code is provided via a channel separate from the first connection. For example, the code can be provided via an SMS message (or an email message) or via a web interface.

In FIG. 36, it is determined (3621) whether the received code matches the provided code. If there is a match, the source of the request is associated (3623) with the reference. The connection provider calls (3625) the callee to establish a second connection and bridges (3627) the first connection and the second connection to connect the caller and the callee. If it is determined (3621) that the received code does not match the provided code, the source is placed (3615) on a list of blocked sources.

If it is determined (3607) that the source of the request has been previously confirmed to be associated with the reference, the caller is prompted (3609) for an input over the first connection and it is determined whether the received input is for blocking the source and whether the received input is for confirming the request.

If it is determined (3611) that the received input is for blocking the source, the source of the request is placed (3615) on a list of blocked sources. If it is determined (3613) that the received input is for confirming/accepting the request, the connection provider calls (3625) the callee to establish a second connection and bridges (3627) the first connection and the second connection to connect the caller and the callee.

In one embodiment, the method of requiring a caller to explicitly provide input to verify the acceptance of the call (e.g., via pressing a key, providing a voice command, confirm a verification code, or passing a CAPTCHA test) can also be used to block calls initiated from the caller via automatic means. For example, a click to call button can be provided to call a connection provider to request a connection to a callee via a VoIP-based application; a click to dial button can be selected by a caller to cause the caller's device (e.g., a mobile phone, a PDA, or a computer connected to a telephone line) to dial a call to the connection provider to request a connection to a callee. The source of the request can be placed on a blocked list if the caller fails to verify the call.

From this description, it will be appreciated that certain aspects are embodied in the user devices, certain aspects are embodied in the server systems, and certain aspects are embodied in a system as a whole. Some embodiments can be implemented using hardware, programs of instruction, or combinations of hardware and programs of instructions.

In general, routines executed to perform the disclosed methods may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods disclosed. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions for implementation. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the description has been provided with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:

providing, via a server system, a first advertisement of an advertiser via a network to an end-user computing device of a customer, the first advertisement including a mechanism for the customer to make a selection of the first advertisement;

responsive to receiving an indication that the customer has made a selection of the first advertisement, obtaining, via the server system, a communication reference for the customer from the customer;

responsive to obtaining the communication reference for the customer, establishing, via the server system, a connection for real-time communications using the communication reference;

receiving, via the server system, from the customer, an indication of an acceptance of real-time communications or a rejection of the real-time communications;

responsive to receiving, from the customer, the indication of the acceptance of the real-time communications, initiating, via the server system, the real-time communications between the customer and the advertiser at least in part by a connection server of the server system directing a first virtual softphone and a second virtual softphone to establish a direct media connection, which does not go through the connection server, wherein the first virtual softphone terminates a first voice over Internet protocol connection for bridging onto a public switched telephone network, and the second virtual softphone terminates a second voice over Internet protocol connection for bridging onto the public switched telephone network, and charging, via the server system, the advertiser an advertisement fee in response to initiating the real-time communications between the customer and the advertiser; and responsive to receiving, from the customer, the indication of the rejection of the real-time communications, blocking, via the server system, a selection by the customer of a second advertisement of the advertiser presented to the customer.

2. The method of claim 1, wherein the communication reference comprises a telephonic reference; and the connection for real-time communications comprises a telephone connection for telephone conversation.

3. The method of claim 2, wherein the establishing the connection for real-time communications comprises the connection server establishing the first voice over Internet protocol connection with a telecommunication carrier which bridges the first voice over Internet protocol connection to a connection of the customer on the public switched telephone network according to the communication reference.

4. The method of claim 3, wherein the initiating real-time communications between the customer and the advertiser comprises the connection server establishing the second voice over Internet protocol connection with the telecommunication carrier which bridges the second voice over Internet protocol connection to a connection of the advertiser on the public switched telephone network.

5. The method of claim 2, wherein the indication of acceptance of the real-time communications comprises an audio signal generated from pressing at least one key on a phone over the connection with the customer established using the communication reference.

6. The method of claim 5, wherein the audio signal comprises a dual-tone multi-frequency signal.

7. The method of claim 5, further comprising:
providing a code to the customer; and
determining whether the audio signal matches with the code; wherein the connection for real-time communications established with the customer using the communication reference is accepted when the audio signal matches with the code.

8. The method of claim 7, wherein the code IS provided as a completely automated public Turing test to tell computers and humans apart.

9. The method of claim 7, wherein the code is provided via a distorted display of the code.

10. The method of claim 7, wherein the code is provided to the customer during obtaining the communication reference.

11. The method of claim 7, wherein the code is provided via a connection separate from the connection with the customer established using the communication reference.

12. The method of claim 7, wherein the code is provided prior to establishing the connection for real-time communications using the communication reference.

13. The method of claim 5, wherein the communication reference comprises at least one of a telephone number without an extension, a telephone number with an extension, a session initiation protocol uniform resource identifier, an instant messaging user identifier, or a voice over Internet protocol user identifier.

14. The method of claim 2, further comprising:
providing an audio advertisement for the advertiser to the customer over the connection for real-time communications;
wherein the indication of acceptance of the real-time communications comprises the customer maintaining the connection for real-time communications to a completion of the audio advertisement transmitted over the connection with the customer established using the communication reference.

15. The method of claim 1, further comprising:
unblocking the selection of the second advertisement by the customer after a predetermined period of time.

16. The method of claim 1, further comprising:
requesting identification information of the customer for a subsequent advertisement selection after receiving the indication of the rejection of the real-time communications.

17. A tangible, non-transitory, machine readable media storing instructions, which when executed by a computing device, cause the computing device to:
provide a first advertisement of an advertiser via a network to an end-user computing device of a customer, the first advertisement including a mechanism for the customer to make a selection of the first advertisement;
responsive to receiving an indication that the customer has made a selection of the first advertisement, obtain a communication reference for the customer from the customer;
responsive to obtaining the communication reference for the customer, establish a connection for real-time communications using the communication reference;
receive from the customer, an indication of one of an acceptance of real-time communications or a rejection of the real-time communications;
responsive to receiving, from the customer, the indication of the acceptance of the real-time communications, initiate the real-time communications between the customer and the advertiser at least in part by a connection server of the server system directing a first virtual softphone and a second virtual softphone to establish a direct media connection, which does not go through the connection server, wherein the first virtual softphone terminates a first voice over Internet protocol connection for bridging onto a public switched telephone network, and the second virtual softphone terminates a second voice over Internet protocol connection for bridging onto the public switched telephone network, and
charge the advertiser an advertisement fee in response to initiating the real-time communications between the customer and the advertiser; and
responsive to receiving, from the customer, the indication of the rejection of the real-time communications, block a selection by the customer of a second advertisement of the advertiser presented to the customer.

18. A system comprising:
one or more servers comprising:
a memory; and
a processor coupled to the memory, the one or more servers to:
provide a first advertisement of an advertiser via a network to an end-user computing device of a customer, the first advertisement including a mechanism for the customer to make a selection of the first advertisement;
responsive to receiving an indication that the customer has made a selection of the first advertisement, obtain a communication reference for the customer from the customer;
responsive to obtaining the communication reference for the customer, establish a connection for real-time communications using the communication reference
receive, from the customer, an indication of one of an acceptance of real-time communications or a rejection of the real-time communications;
responsive to receiving, from the customer, the indication of the acceptance of the real-time communications,
initiate the real-time communications between the customer and the advertiser at least in part by a connection server of the server system directing a first virtual softphone and a second virtual softphone to establish a direct media connection, which does not go through the connection server, wherein the first virtual softphone terminates a first voice over Internet protocol connection for bridging onto a public switched telephone network, and the second virtual softphone terminates a second voice over Internet protocol connection for bridging onto the public switched telephone network, and charge the advertiser an advertisement fee in response to initiating the real-time communications between the customer and the advertiser; and responsive to receiving, from the customer, the indication of the rejection of the real-time communications, block a selection by the customer of a second advertisement of the advertiser presented to the customer.

19. The tangible, non-transitory, machine readable media of claim 17, wherein:

the establishing the connection for real-time communications comprises the connection server establishing the first voice over Internet protocol connection with a telecommunication carrier which bridges the first voice over Internet protocol connection to a connection of the customer on the public switched telephone network according to the communication reference; and the initiating real-time communications between the customer and the advertiser comprises the connection server establishing the second voice over Internet protocol connection with the telecommunication carrier which bridges the second voice over Internet protocol connection to a connection of the advertiser on the public switched telephone network.

20. The system of claim 18, wherein:

the establishing the connection for real-time communications comprises the connection server establishing the first voice over Internet protocol connection with a telecommunication carrier which bridges the first voice over Internet protocol connection to a connection of the customer on the public switched telephone network according to the communication reference; and the initiating real-time communications between the customer and the advertiser comprises the connection server establishing the second voice over Internet protocol connection with the telecommunication carrier which bridges the second voice over Internet protocol connection to a connection of the advertiser on the public switched telephone network.

* * * * *